(12) United States Patent
Crozier et al.

(10) Patent No.: US 10,697,759 B2
(45) Date of Patent: Jun. 30, 2020

(54) ALL-IN-ONE INTEGRATED SENSING DEVICE FOR MACHINE CONTROL

(71) Applicant: Trimble Navigation Limited, Sunnyvale, CA (US)

(72) Inventors: Scott Tasman Crozier, Westminster, CO (US); Kevin Ray Nau, New Carlisle, OH (US)

(73) Assignee: Trimble Navigation Limited, Sunnyvale, CA (US)

(*) Notice: Subject to any disclaimer, the term of this patent is extended or adjusted under 35 U.S.C. 154(b) by 68 days.

(21) Appl. No.: 16/117,072

(22) Filed: Aug. 30, 2018

(65) Prior Publication Data

US 2019/0003825 A1   Jan. 3, 2019

Related U.S. Application Data

(62) Division of application No. 14/467,426, filed on Aug. 25, 2014, now Pat. No. 10,094,654.

(51) Int. Cl.
*G01B 11/00* (2006.01)
*G01S 17/86* (2020.01)
(Continued)

(52) U.S. Cl.
CPC .............. *G01B 11/14* (2013.01); *E02F 3/435* (2013.01); *E02F 9/264* (2013.01); *G01M 1/122* (2013.01);
(Continued)

(58) Field of Classification Search
None
See application file for complete search history.

(56) References Cited

U.S. PATENT DOCUMENTS 4,129,224 A    12/1978  Teach
4,884,939 A *  12/1989  Nielsen ............... E02F 3/435
                                                     414/698
(Continued)

FOREIGN PATENT DOCUMENTS

JP       2006 194823       7/2006
WO    WO 2010/074003      7/2010
WO    WO 2015166210 A1   11/2015

OTHER PUBLICATIONS

PCT International Preliminary Report on Patentability (dated Feb. 28, 2017—dated Mar. 9, 2017).
(Continued)

*Primary Examiner* — John C Kuan
(74) *Attorney, Agent, or Firm* — Frederick H. Gribbell; Russell F. Gribbell; Aaron S. Brodsky

(57) ABSTRACT

An integrated sensing device with a suite of sensors assists construction machine operators in finding the correct level to dig a ditch/trench. The sensing device includes a gravity sensor to determine angles, a laser distance meter (LDM), and a laser receiver for detecting a known jobsite elevation. The sensing device is mounted to the dipper stick of an excavator; the gravity sensor detects the angle of the stick, and the laser receiver detects a laser plane of light that represents a known jobsite elevation. The LDM is aimed at another member of the machine that moves in a predetermined path as the bucket is rotated, and the distance between the LDM and the target member is used to calculate the vertical elevation of the working tool edge. A display graphically shows the operator the proper dig depth and the present position of the working tool edge.

12 Claims, 14 Drawing Sheets

(51) Int. Cl.
*G01S 17/88* (2006.01)
*G01S 19/14* (2010.01)
*E02F 3/43* (2006.01)
*E02F 9/26* (2006.01)
*G01B 11/14* (2006.01)
*G01M 1/12* (2006.01)

(52) U.S. Cl.
CPC .............. *G01S 17/86* (2020.01); *G01S 17/88* (2013.01); *G01S 19/14* (2013.01)

(56) References Cited

U.S. PATENT DOCUMENTS

| | | |
|---|---|---|
| 5,343,033 A | 8/1994 | Cain |
| 5,471,049 A | 11/1995 | Cain |
| 5,486,690 A | 1/1996 | Ake |
| 6,263,595 B1 | 7/2001 | Ake |
| 6,388,743 B1 | 5/2002 | Aharon |
| 7,012,237 B1 | 3/2006 | Ake |
| 7,409,312 B2 | 8/2008 | Conner |
| 7,414,704 B1 | 8/2008 | Nau |
| 8,145,394 B2 | 3/2012 | Chiorean |
| 8,363,210 B2 | 1/2013 | Montgomery |
| 2006/0230645 A1* | 10/2006 | McCain .................. E02F 3/437 37/348 |
| 2010/0052684 A1* | 3/2010 | Fling ........................ E02F 9/24 324/326 |
| 2012/0308354 A1 | 12/2012 | Tafazoli Bilandi |
| 2013/0033963 A1 | 2/2013 | Lindskov |
| 2015/0116694 A1 | 4/2015 | Van Toorenburg |

OTHER PUBLICATIONS

Notification Concerning Transmittal of International Preliminary Report on Patentability (dated Mar. 9, 2017).
ISA International Search Report (dated Nov. 18, 2015).
Article 19 Amendment for PCT/US2015/043132, filed Jan. 10, 2016.

* cited by examiner

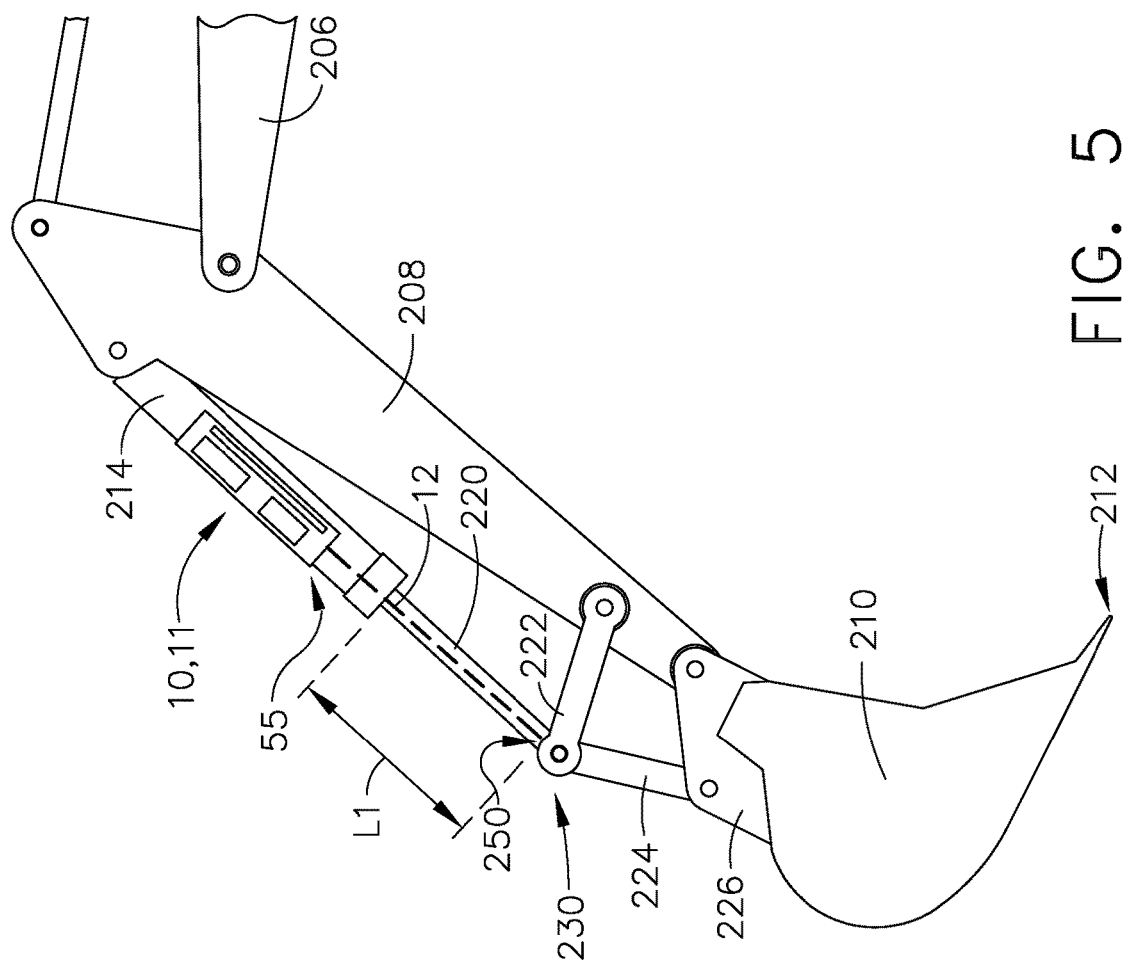
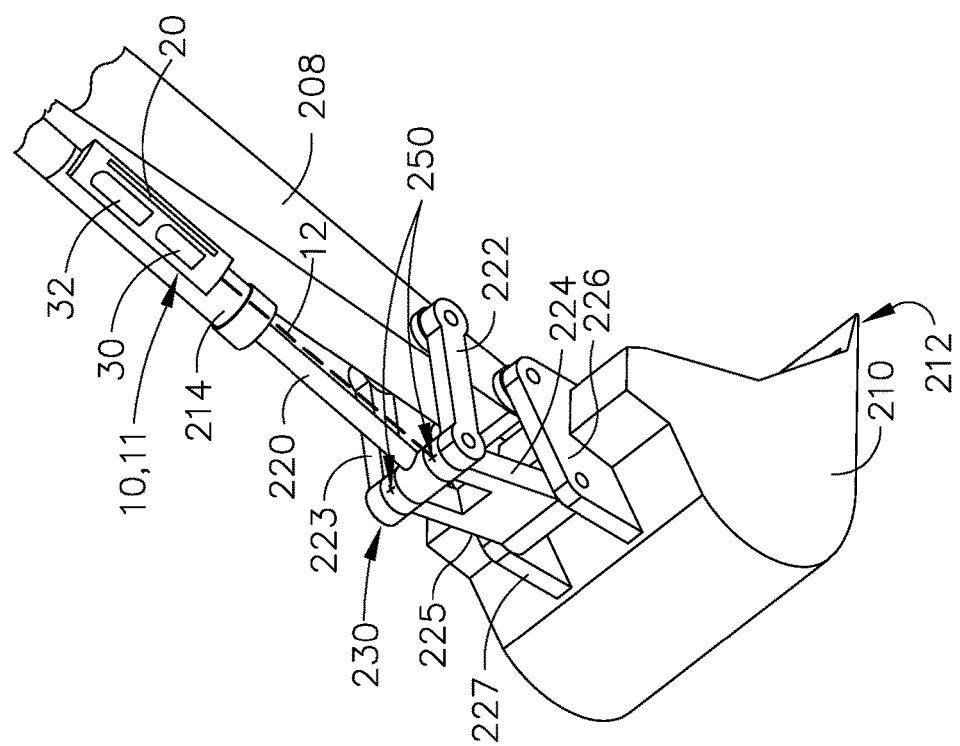

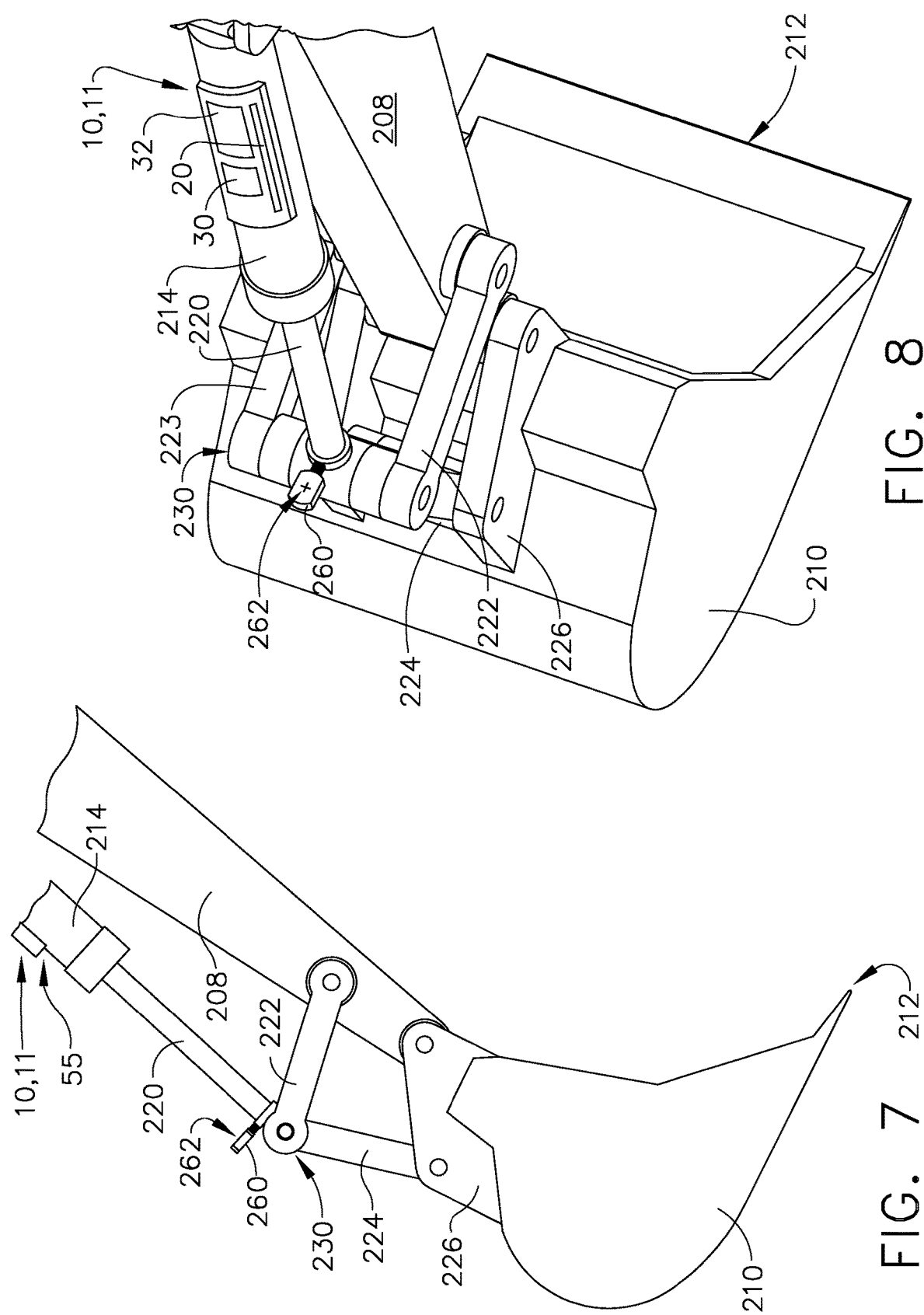

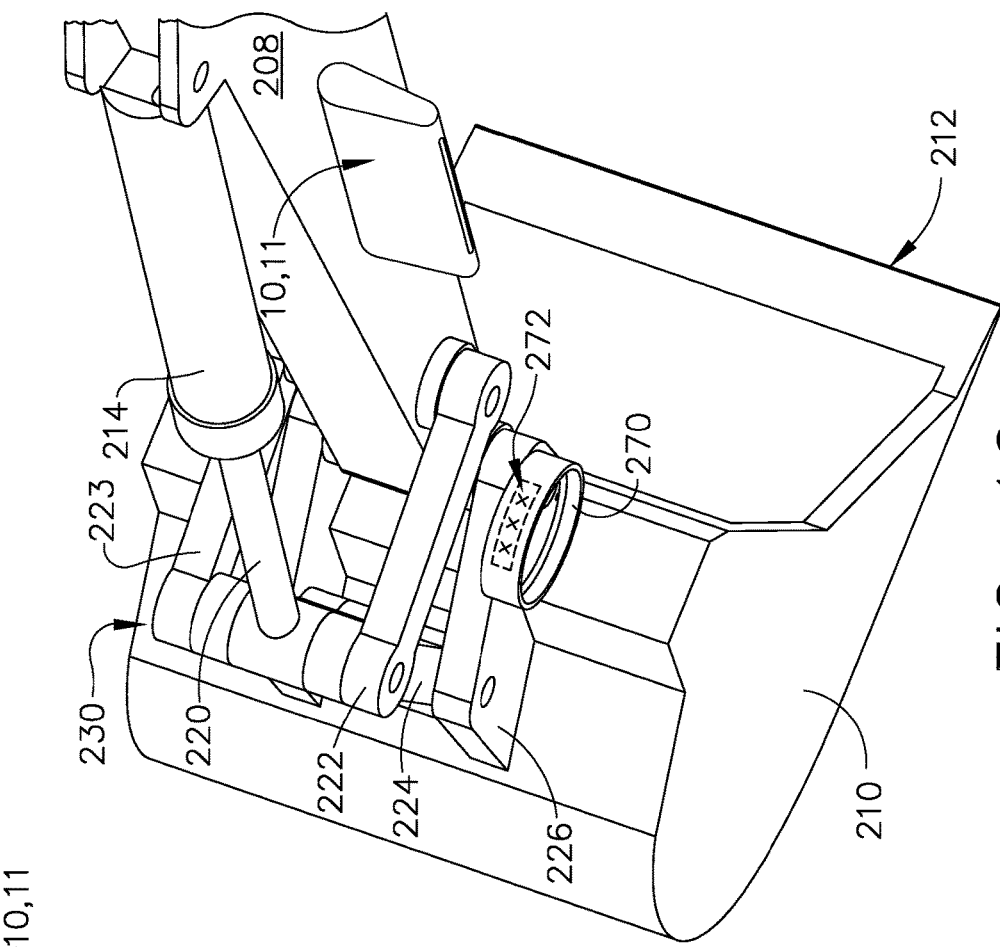
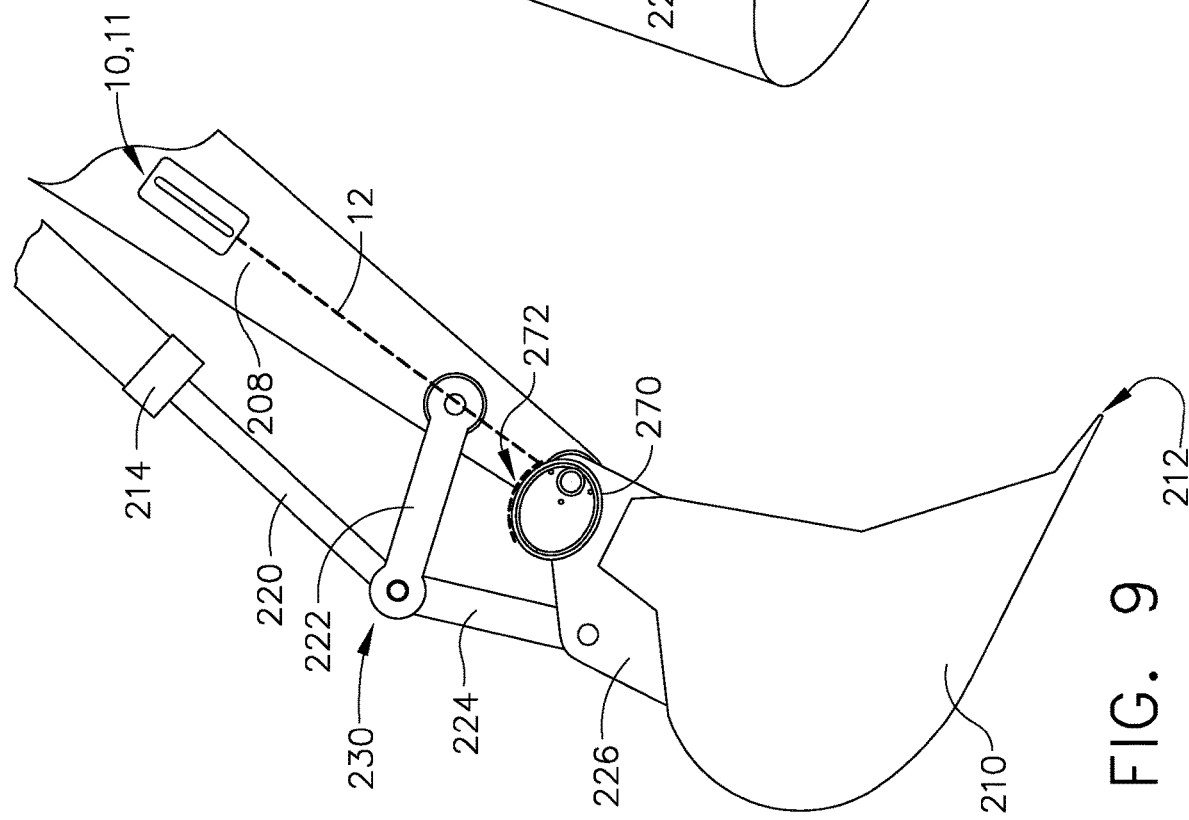

ALL-IN-ONE INTEGRATED SENSING DEVICE FOR MACHINE CONTROL

CROSS-REFERENCE TO RELATED APPLICATIONS

The present application is a divisional to application Ser. No. 14/467,426, titled "ALL-IN-ONE INTEGRATED SENSING DEVICE FOR MACHINE CONTROL," filed on Aug. 25, 2014.

TECHNICAL FIELD

The technology disclosed herein relates generally to construction equipment and is particularly directed to sensing devices of the type which assist operators of construction machines, such as excavators and the like. Embodiments are specifically disclosed as an integrated sensing device having a suite of sensors to assist in directing the machine operator as to finding the correct level to dig a ditch or a trench. The sensing device typically includes a gravity sensor to determine angles, an electronic distance measuring device such as a laser distance meter ("LDM"), and a laser receiver for detecting a predetermined jobsite elevation. The sensing device can also be provided with a GPS receiver as an option.

The sensing device can be mounted to one of the members of the construction machine, such as on the bucket cylinder that runs along the side of the stick member of an excavator. The laser distance meter (LDM) is aimed at one of the other members of the machine, in which the target member moves in a predetermined path as the bucket cylinder is actuated to rotate the bucket's working tool edge (e.g., the teeth of the bucket). Using appropriate geometric equations, the distance between the LDM and the target member can be used, along with knowing the angle of the stick (from the gravity sensor), to calculate the vertical elevation of the working tool edge with respect to a datum on the sensing device. When the laser receiver is receiving laser light energy from a laser plane of a given elevation on the jobsite, the vertical elevation of the working tool edge can be determined with respect to that given jobsite elevation.

The sensing device can display the elevation on an integral display, and/or the sensing device can electronically transmit data to a remote display positioned close to the machine's operator; that remote display could be a smart phone, if desired. The remote display (or smart phone) can graphically show the operator the proper dig depth while also showing the operator the present position of the working tool edge (e.g., the bucket's cutting edge); the remote display can also provide a digital readout, informing the machine operator the exact distance between the proper dig depth and the current position of the bucket's cutting edge.

If a GPS receiver is included (as an optional feature) in the sensing device, it can provide information to the machine operator as to where the machine is currently located on the earth's surface. As another option, the GPS receiver can assist in finding the correct elevation of the machine's working tool edge at times when the laser receiver is not physically within the jobsite's laser plane.

Yet another option is to provide a second gravity (angle) sensor to be mounted on the boom of the excavator machine. This arrangement can also supplement the current position information of the bucket and stick at times when the laser receiver is not physically within the jobsite's laser plane.

STATEMENT REGARDING FEDERALLY SPONSORED RESEARCH OR DEVELOPMENT

None.

BACKGROUND

Construction machines such as excavators need to be guided with respect to their working tools and the desired dig elevation when digging a trench or a ditch. Modern electronic sensing instruments are typically used to assist the operator of such excavator machines, but in conventional systems, various different types of sensing components must individually be installed at different locations on the excavator machine itself. Each of those components then must individually be calibrated to the particular machine that it has been mounted to, before the operator can perform any useful tasks.

SUMMARY

Accordingly, it is an advantage to provide an integrated sensing device as a unitary component that combines more than one type of sensor, and which can be mounted at a single position on an excavator machine, yet will provide the essential information that lets the operator of the excavator machine know where to dig, all based on information gathered by the sensors in this single mountable sensing device.

It is another advantage to provide an integrated sensing device that is mounted to an excavator or other construction machine in which several types of sensors are included in a unitary package that is calibrated at the factory, and therefore which can be calibrated to the machine in a single set-up procedure, performed rather quickly, due to the fewer component housings that need to be installed on the construction machine, as compared to conventional control systems.

It is yet another advantage to provide an integrated sensing device that can be mounted to a construction machine by a customer and then set up by that customer to select the proper geometric equations to be used for a given model and make of construction machine, while giving that customer various options for device placement on the machine and for type and location of the target for aiming the LDM, and thereafter making the system ready for use on a jobsite.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an integrated sensing device that is mounted to a construction machine which has a first member that exhibits movement through a pathway that is variable with respect to gravity, and has a second member that includes a working tool edge, wherein the second member has a known physical moving relationship to the first member through a predetermined range of motions, the integrated sensing device comprising: (a) a laser receiver having at least one photosensor, the laser receiver detecting a position of incoming laser light that reaches the at least one photosensor; (b) an electronic angle sensor; (c) an electronic distance sensor, having an output that is directed at a predetermined target, and which determines a distance to the target without making physical contact with the target; and (d) a processing circuit and a memory circuit; (e) wherein:

(i) the integrated sensing device is mounted to the first member of the construction machine; (ii) the electronic distance sensor determines a distance between the output and the predetermined target; (iii) the predetermined target comprises a surface portion of the construction machine that moves at the same time as the second member moves with respect to the first member; (iv) the surface portion comprises one of: (A) a surface area of the second member; (B) a reflector placed on the second member; (C) a surface area of a linkage member that is mechanically connected to at least one of the first member and the second member; and (D) a reflector placed on the linkage member that is mechanically connected to at least one of the first member and the second member; and (v) the first member exhibits a first shape having a known first geometry, the second member exhibits a second shape having a known second geometry; the first and second known geometries having a known relationship with one another while the first and second members are moved during operation; and (f) wherein: the processing circuit is configured to calculate a vertical distance between the incoming laser light and the working tool edge, based upon a state of the sensor outputs of the at least one photosensor, the electronic angle sensor, and the electronic distance sensor.

In accordance with another aspect, an integrated sensing device that is mounted to a construction machine which has a first member that exhibits movement through a pathway that is variable with respect to gravity, and has a second member that includes a working tool edge, wherein the second member has a known physical moving relationship to the first member through a predetermined range of motions, the integrated sensing device comprising: (a) a GPS receiver; (b) an electronic angle sensor; (c) an electronic distance sensor, having an output that is directed at a predetermined target, and which determines a distance to the target without making physical contact with the target; and (d) a processing circuit and a memory circuit; (e) wherein: (i) the integrated sensing device is mounted to the first member of the construction machine; (ii) the electronic distance sensor determines a distance between the output and the predetermined target; (iii) the predetermined target comprises a surface portion of the construction machine that moves at the same time as the second member moves with respect to the first member; (iv) the surface portion comprises one of: (A) a surface area of the second member; (B) a reflector placed on the second member; (C) a surface area of a linkage member that is mechanically connected to at least one of the first member and the second member; and (D) a reflector placed on the linkage member that is mechanically connected to at least one of the first member and the second member; and (v) the first member exhibits a first shape having a known first geometry, the second member exhibits a second shape having a known second geometry; the first and second known geometries having a known relationship with one another while the first and second members are moved during operation; and (f) wherein: the processing circuit is configured to calculate a vertical distance between a GPS antenna centroid and the working tool edge, based upon a state of the sensor outputs of the GPS receiver, the electronic angle sensor, and the electronic distance sensor.

In accordance with yet another aspect, a method for digging on a construction jobsite, is provided, in which the method comprises the following steps: (a) providing an integrated sensing device, comprising: (i) a laser receiver having at least one photosensor, the laser receiver detecting a position of incoming laser light that reaches the at least one photosensor; (ii) an electronic angle sensor; (iii) an electronic distance sensor, having an output that is directed at a predetermined target, thereby determining a distance to the target without making physical contact with the target; and (iv) a processing circuit and a memory circuit; (b) mounting the integrated sensing device to a first member of a construction machine, wherein: (i) the first member exhibits movement through a pathway that is variable with respect to gravity; and (ii) a second member of the construction machine includes a working tool edge for digging solid material, the second member having a known physical moving relationship to the first member through a predetermined range of motions; (c) using the electronic distance sensor, determining a distance between the output and the predetermined target, wherein: (i) the predetermined target comprises a surface portion of the construction machine that moves at the same time as the second member moves with respect to the first member; (ii) the surface portion comprises one of: (A) a surface area of the second member; (B) a reflector placed on the second member; (C) a surface area of a linkage member that is mechanically connected to at least one of the first member and the second member; and (D) a reflector placed on the linkage member that is mechanically connected to at least one of the first member and the second member; and (iii) the first member exhibits a first shape having a known first geometry, the second member exhibits a second shape having a known second geometry; the first and second known geometries having a known relationship with one another while the first and second members are moved during operation; and (e) calculating a vertical distance between the incoming laser light and the working tool edge, based upon a state of the sensor outputs of the at least one photosensor, the electronic angle sensor, and the electronic distance sensor.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIG. 5 is an elevational view of the stick and bucket of an excavator having the integrated sensing device that is constructed according to the principles of the technology disclosed herein mounted to the bucket cylinder.

FIG. 6 is a perspective view of the equipment depicted in FIG. 5.

FIG. 7 is an elevational view of the integrated sensing device of FIG. 5 mounted to the bucket cylinder of an excavator, and in addition a reflective target that is mounted at the end of the cylinder rod.

FIG. 8 is a perspective view of the equipment of FIG. 7.

FIG. 9 is an elevational view of the integrated sensing device of FIG. 5, mounted to the side of a dipper stick and aimed at a target that has been added to the top bracket of the bucket.

FIG. 10 is a perspective view of the equipment of FIG. 9.

DETAILED DESCRIPTION

Figure 1:
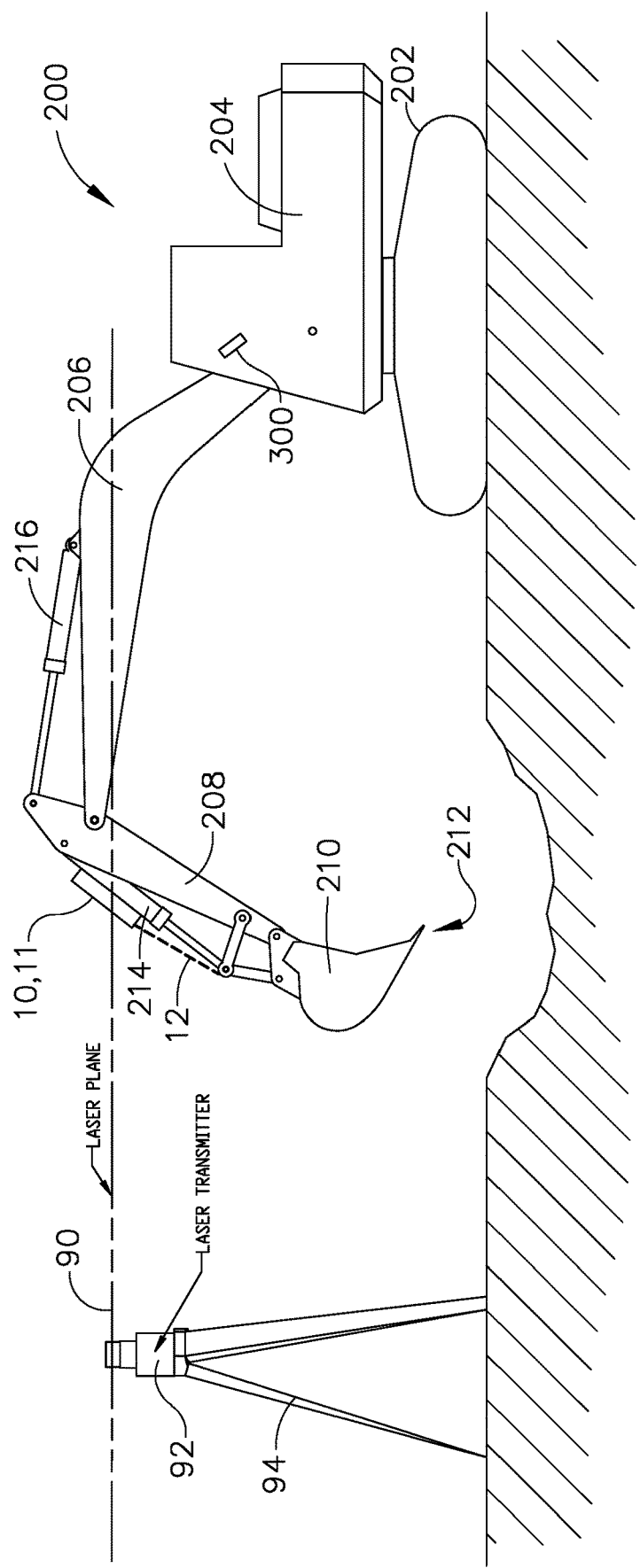
FIG. 1 is a diagrammatic view in elevation of an excavator machine having an integrated sensing device as constructed according to the principles of the technology disclosed herein mounted thereto.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, an excavator machine, generally designated by the reference numeral 200, is depicted as in the process of digging a ditch, and it has a sensing device (also sometimes referred to herein as an "integrated sensing device") constructed according to the principles of the technologies disclosed herein that is mounted to the bucket cylinder on the stick of the excavator. The sensing device is generally designated by the reference numeral 10, and it is mounted to the bucket cylinder 214. The machine's dipper stick 208 is pivotally attached to a bucket 210 that has a working tool edge at 212. The upper end of the stick 208 is pivotally attached to a boom 206 which is pivotally attached to the cab 204 (or main body, sometimes called the "platform") of the excavator.

The stick 208 is controlled by a stick cylinder 216 that is also attached to the boom 206, and the bucket 210 is controlled by the bucket cylinder 214, which is also attached to the stick 208. The cab 204 is mounted to a set of treads 202, which is how the excavator maneuvers on a typical construction jobsite. On FIG. 1, a laser transmitter is mounted on a tripod, in which the tripod is at reference numeral 94 and the laser transmitter is at reference numeral 92. In many construction jobsites, the laser transmitter emits a rotating laser beam, thereby creating a laser plane, which is generally designated by the reference numeral 90 on FIG. 1. It will be understood that the mounting position of the sensing device 10 can be made so it can be adjusted up or down along the length of the bucket cylinder housing. This will allow the laser receiver photosensors to be positioned along a greater distance, to accommodate situations where the excavator has to make deeper or shallower digs with respect to the position of the rotating laser plane 90.

The operator in the cab 204 has some type of computer display at 300, which receives signals from the sensing device 10, which helps the operator to decide how deep the bucket cutting edge 212 should be when digging a ditch or a trench. The sensing device 10 includes an electronic distance measuring device 50 (see FIG. 2), which typically comprises a laser distance meter (also referred to as an "LDM") that emits a laser beam at the reference numeral 12. The laser distance meter can measure the distance between its emitting port 55 on the sensing device 10 and one of the machine parts, as is described below in greater detail.

Figure 2:
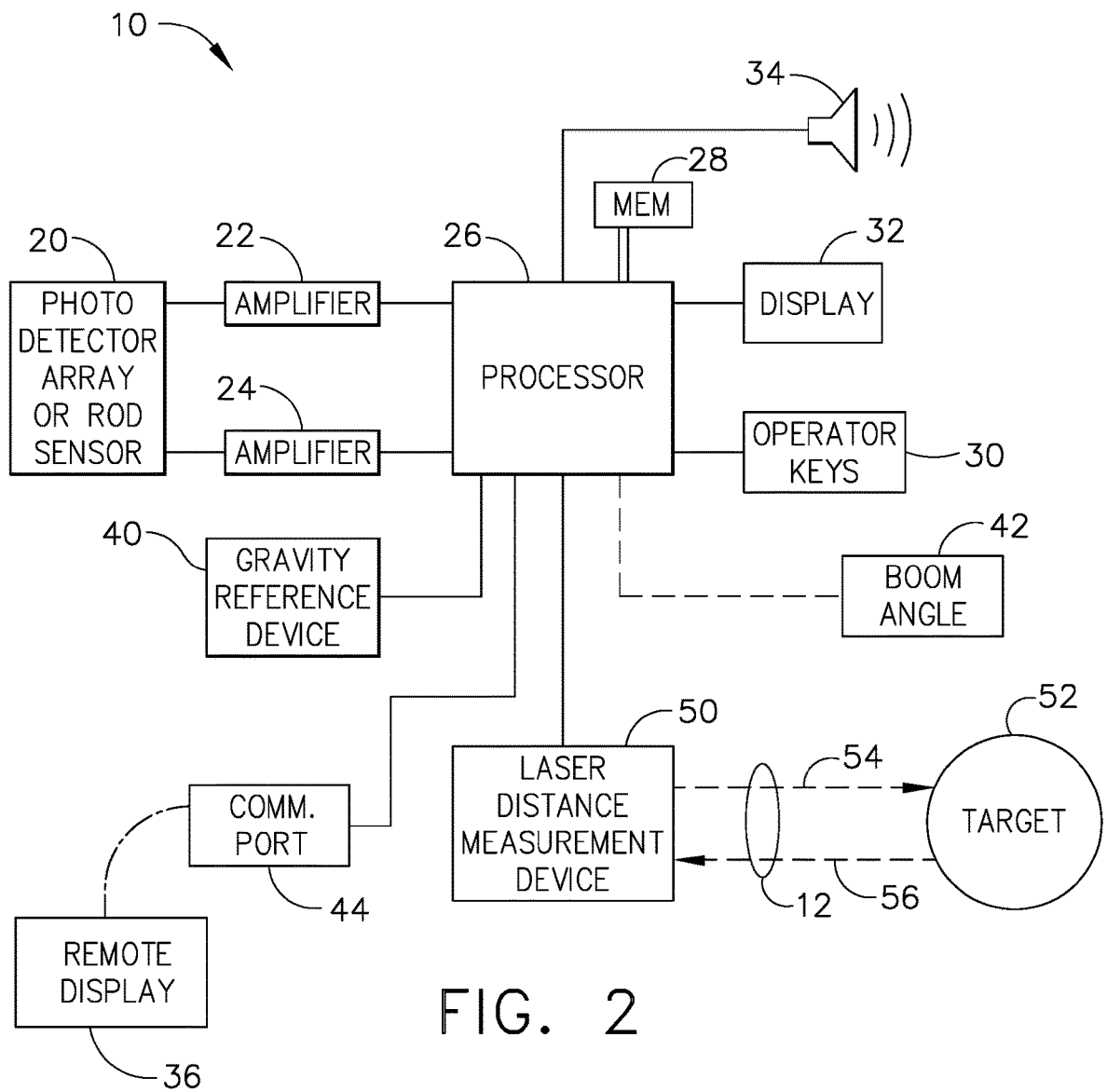
FIG. 2 is a block diagram of the major components of the integrated sensing device of FIG. 1 mounted to the excavator of FIG. 1.

FIG. 2 is a hardware block diagram that depicts many of the major electronic components for the sensing device 10. In sensing device 10, a photodetector array or a rod sensor is used to detect the position in which the laser plane 90 is intersecting the sensing device 10. On FIG. 2, the photosensors are generally depicted by the reference numeral 20. Typically, such a photodetector array or rod sensor will have two outputs, and each output is directed through an individual amplifier 22 or 24. These signals are directed to some type of microprocessor or microcontroller at 26, which will typically contain at least one analog-to-digital converter (also called an "ADC"), which converts the signals from the outputs of the amplifiers 22 and 24 into digital numbers. The processing circuit 26 will have some associated memory elements that are generally depicted at the reference numeral 28, as a memory circuit. If the processor 26 is a microcontroller, the memory elements 28 will typically be on-board that processor chip; however, that is not required.

Another one of the sensing instruments on FIG. 2 is a gravity reference device 40, which is an angle-sensing instrument that can provide an output signal to the processor 26 that is related to the angle of this sensing instrument with respect to the vertical (which is sensed as the direction of gravity). Another sensing instrument is a laser distance measurement device 50, which acts as the laser distance meter (LDM) that was briefly discussed above. On FIG. 2, the laser distance meter 50 is schematically depicted as having an emission light beam at 54 that is directed toward a target at 52, and some of that emission beam 54 will be reflected back as a reflective light beam 56. Many LDMs are "time of flight" devices, which means that they measure distance by determining the amount of time it takes for the emission beam 54 to be splashed against the target 52, and a portion of its energy reflected back as the reflective beam 56. Since such devices use light beams (that travel at the speed of light), the distance can be directly determined from that time of flight value. Many other LDMs are "phase shift" devices, and their measured distance is indirectly determined from a modulated output light signal and its phase shift upon return. On FIG. 2, the combination of the output emission beam 54 and the reflective incoming beam 56 are generally designated by the reference numeral 12.

Yet another sensor is an optional boom angle sensor 42, which typically would be mounted on the boom 208 of the excavator 200, and also typically would be a gravity sensing instrument, much like the angle sensor 40.

The processor 26 determines several parameters including the vertical distance from the working tool edge to the intersection of the laser plane and photodetector sensors. This parameter is compared to the desired same distance and output to the display 32 to give the operator offgrade readout information. The sensing device 10 has a keypad at 30, which allows the operator to set up the sensing device and put it into a particular operating mode, as desired. Processing circuit 26 has several output signals, including to a local display (or lighted indicators) 32 that can give the operator visual readout information (while setting up the sensing device 10, for example), and to a small optional beeper 34 to get the attention of the operator, as needed. In addition to the above "on-board" output devices, there is a communications circuit 44 that sends signals to the remote display 36 monitor, which is the device that is positioned proximal to the operator of the earthmoving machine. Communications circuit 44 can be either a wireless device, or a "wired" device—a choice made by the overall system designer or by the setup man. (A wireless system is preferred.)

Figure 3:
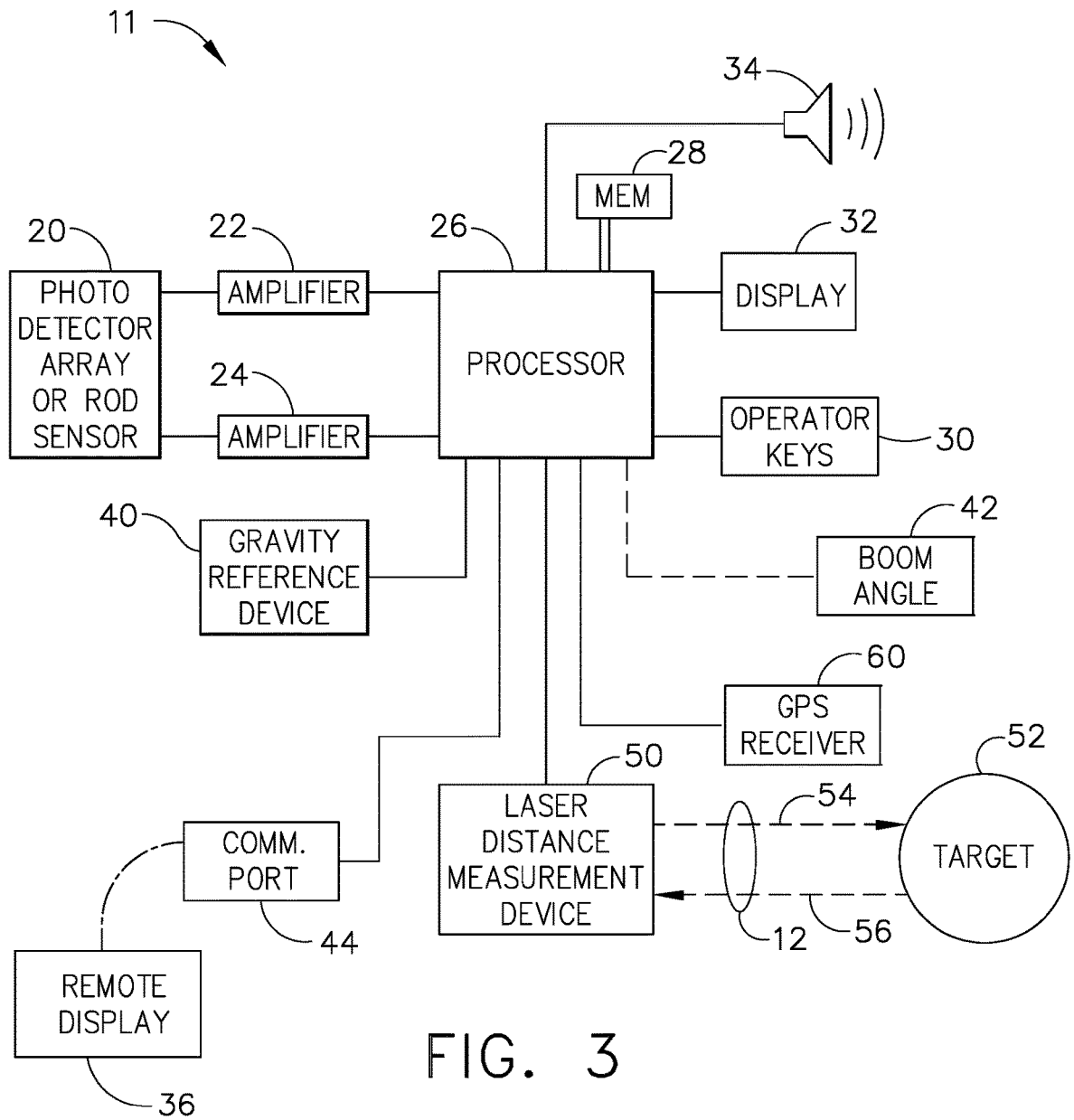
FIG. 3 is a block diagram showing the major components of an alternative embodiment of the integrated sensing device according to the principles of the technology disclosed herein.

Referring now to FIG. 3, another block diagram of major hardware components is depicted, much like that of FIG. 2. In FIG. 3, a GPS receiver has been added as one of the input sensors at 60, and can provide one-dimensional, two-dimensional, or three-dimensional information to the processing circuit 26. The overall integrated sensing device in this configuration is generally referred to by the reference numeral 11. All of the other sensors and output devices that were found on FIG. 2 are also depicted on FIG. 3. This includes a laser distance meter 50, which is schematically depicted as having an emission light beam at 54 that is directed toward a target at 52, and some of that emission beam 54 will be reflected back as a reflective light beam 56. It will be understood that the beam 52 could consist of a type of energy other than laser light, if desired, and then the device 50 would be a different type of electronic distance measuring device (i.e., other than an LDM).

The GPS receiver 60 is an optional feature, but it can be useful for determining the horizontal location of the working tool edge or in situations where the laser receiver portion of the sensing device 11 suddenly finds itself outside the laser plane 90. The height dimension can temporarily be determined by the GPS receiver 60 in that situation, at least until the dipper stick of the excavator has been moved to an elevation in which the laser plane 90 will once again intersect the photodetectors 20 on the sensing device 11. The processor 26 determines several parameters including the vertical distance from the working tool edge to the centroid of the GPS antenna. This parameter is compared to the desired same distance and output to the display 32 to give the operator readout information. The processor also determines a horizontal distance from the tool edge to the GPS antenna centroid. When the term "GPS receiver" is used herein it implies a GPS, Glonass, Galileo, or any available GNSS satellite constellation and signal band receiver, with differential correction capability using any available correction signal, with a GPS antenna, and with a heading sensor.

Figure 4:
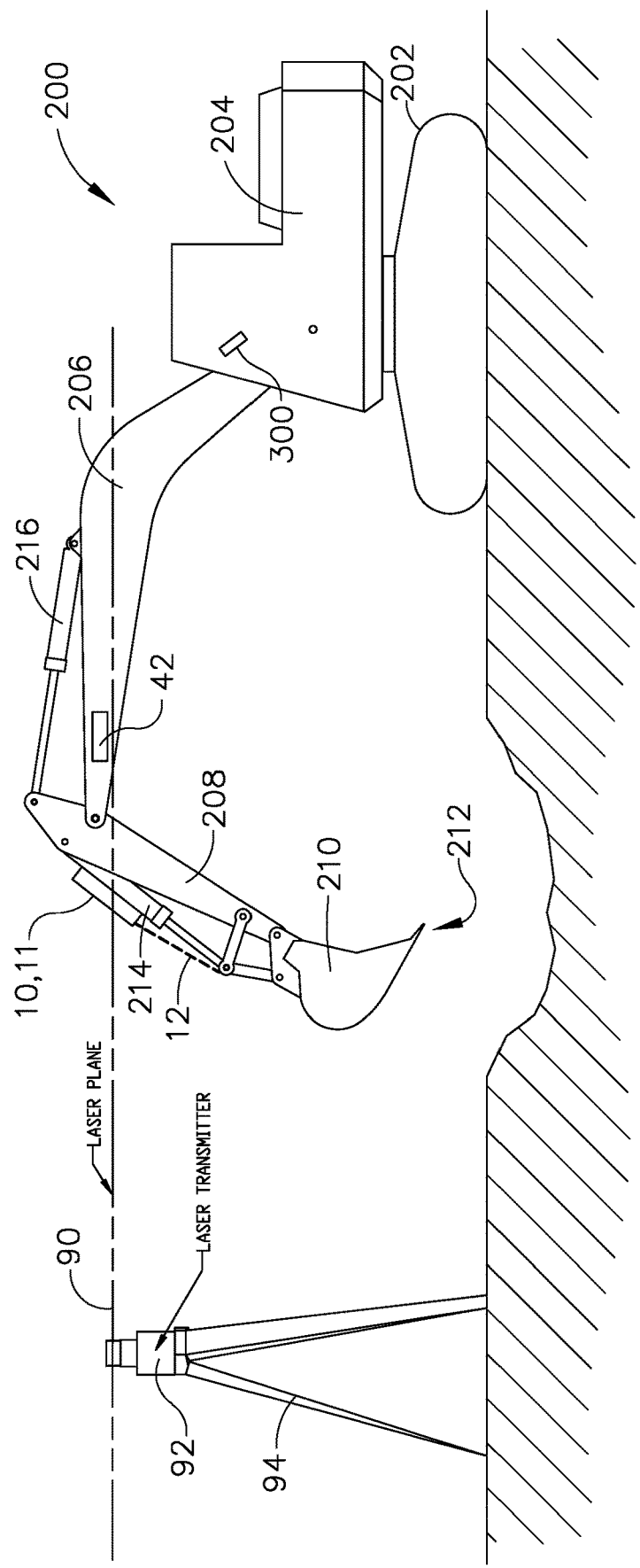
FIG. 4 is a diagrammatic view in elevation of an alternative embodiment of an excavator machine with an integrated sensing device and a separate gravity sensor mounted to the boom.

Referring now to FIG. 4, this view is essentially identical to that depicted in FIG. 1, except the boom angle sensor has been added at 42. The mounting position of the boom angle sensor 42 is exemplary only, and it could be mounted virtually anywhere on the boom, as desired by the system designer. A similar statement can be made about the positioning of the sensing device 10 or 11, although it must be mounted such that the laser distance meter is aiming at an appropriate target that will move in a predetermined movement pathway at the same time the bucket 210 is rotated. Several example excavator members and target locations will now be discussed herein.

Referring now to FIG. 5, the sensing device 10, 11 is once again mounted to the bucket cylinder 214. In this view, the sensing device is mounted on the surface of the bucket cylinder, and the laser distance meter has an emission output at 55. The laser beam (generally depicted by the reference numeral 12) is aimed at a target area, which is depicted by the reference numeral 250. This area 250 is on a rounded portion of a member 224 that is commonly referred to as a "down link." There also is a "dogbone link" 222, and one end of dogbone link 222 is pivotally mounted to the stick 208, while the other end is mounted both to the "down link" 224 and to the cylinder rod 220 of the bucket cylinder 214. There is a common pin that runs through this linkage, and has a center line as a pivot point, which is indicated by the reference numeral 230. The down link 224 is pivotally mounted to a mounting bracket 226, as is the stick 208. The mounting bracket 226 is part of the overall bucket 210, essentially on the opposite end from the bucket's digging edge 212 where the teeth are, which is the working tool portion of the excavator.

As can be understood by viewing FIG. 5 and having general knowledge of how excavator machines operate, when the cylinder rod 220 is fully extended, the distance dimension "L1" will increase to its maximum distance when the cylinder rod is at full extension, and that distance L1 will shrink to its minimum distance (nearly zero) when the cylinder rod is fully retracted. The movements of the cylinder rod 220 under the control of the cylinder 214 are what make the bucket 210 rotate through its various possible rotational positions.

Referring now to FIG. 6, in this perspective view, it is somewhat easier to see the linkage and how the target areas 250 are viewed by the laser distance meter portion of the sensing device 10, 11. The dogbone link is actually two separate links 222 and 223, one on each side of the stick 208. There are two sides to the down link at 224 and 225, and there are two sides to the bracket 226 and 227. There are two possible targets 250, although the laser distance meter would be aimed at only one of those locations, and this can be determined by the set-up man who installs the sensing device 10, 11 on the excavator machine.

In this example illustrated on FIGS. 5 and 6, the laser distance meter is aimed directly at a machine member of the excavator itself. Although it is possible to use reflective tape and place that at the target area 250 if desired, that may not be necessary in practical use. The surface as built by the machine manufacturer may be an acceptable reflector, because laser distance meters are highly sensitive instruments, and even a small percentage of reflected laser energy will typically be detected by the distance meter inputs. Moreover, the LDM device overall has very high noise immunity. On the other hand, if a highly reflective target area is desired for a particular situation, the target area 250 could have a reflective material added to the excavator if desired. Such a reflective material can not only make it a more easily-seen target area for the laser distance meter, but also it can be placed at a position that will allow for somewhat easier sensing device positioning and math, regarding the geometric equations that are required to calculate the position of the working tool edge 212 with respect to the extension of the cylinder ram 220. Of course, if the machine "as-built" surface is selected as the target area, one of the criteria could be designating an area at a position that will allow for somewhat easier sensing device positioning and math, regarding those geometric equations.

Referring now to FIG. 7, the same excavator members are depicted as found on FIG. 5, with the addition of a special target 260. In this situation, the target 260 is mounted to the "outside" of the bucket cylinder, right at the distal end of the cylinder rod 220. In this configuration, the target 260 remains proximal to the dogbone member 222, even when the bucket cylinder 214 is fully extended, as seen on FIG. 7. The laser distance meter is emitted at 55, and is aimed at a target area surface 262 on the special target 260. This can be better viewed in FIG. 8, which shows the same arrangement as FIG. 7 in the perspective view. The surface 262 could be highly reflective, or not, as desired by the set-up operator.

Referring now to FIG. 9, the same excavator elements are illustrated as were also depicted in FIGS. 5 and 7. On FIG. 9, a different type of target device has been mounted to the bucket, proximal to the bracket 226. This target device is generally designated by the reference numeral 270, and could be any size or shape, but is illustrated as elliptical in its shape, which can be customized for a particular excavator configuration with respect to how its bucket movements create a spatial pathway as the bucket is rotated. In general, the target 270 will be shaped to provide an easily-defined geometric relationship for the equations that are used to calculate the bucket working edge 212 position with respect to the distance to the target 270. On FIG. 9, a certain portion of the surface of the target 270 can optionally be coated with reflective tape or it can optionally be painted in a reflective paint, and that portion is indicated at the reference numeral 272. This can be more easily seen on FIG. 10, which is a perspective view of this same arrangement of FIG. 9. As can be more easily seen on FIG. 10, the sensing device 10, 11 is this time mounted on the side of the dipper stick 208. This is so it can be better aimed at the target area, which is along the side of the dogbone member 222.

Figure 11:
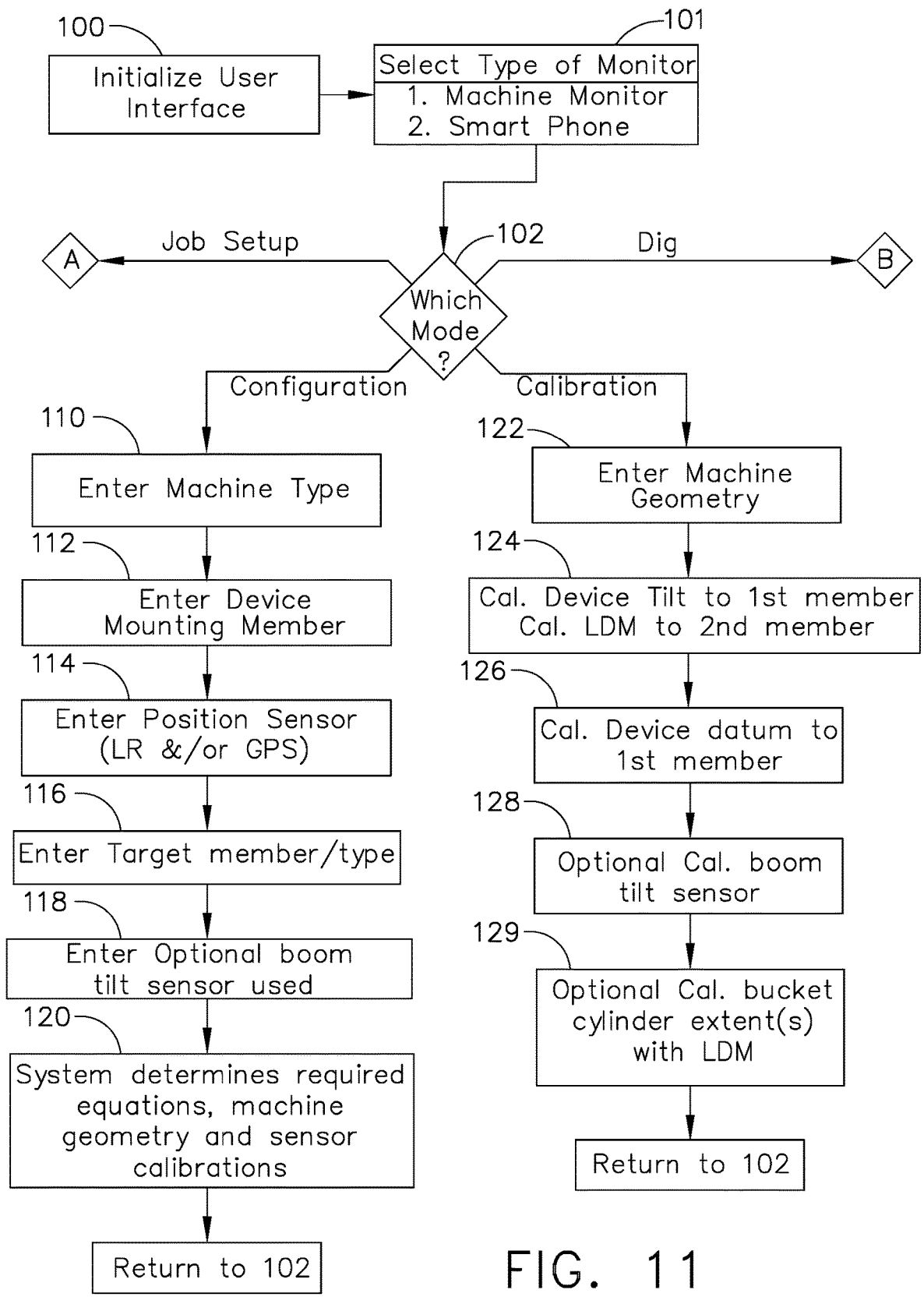
FIG. 11 is a flow chart of the steps performed for a general (simplified) calibration routine to be used with the system that includes the integrated sensing device of the technology disclosed herein as mounted to an excavator machine.
Figure 12:
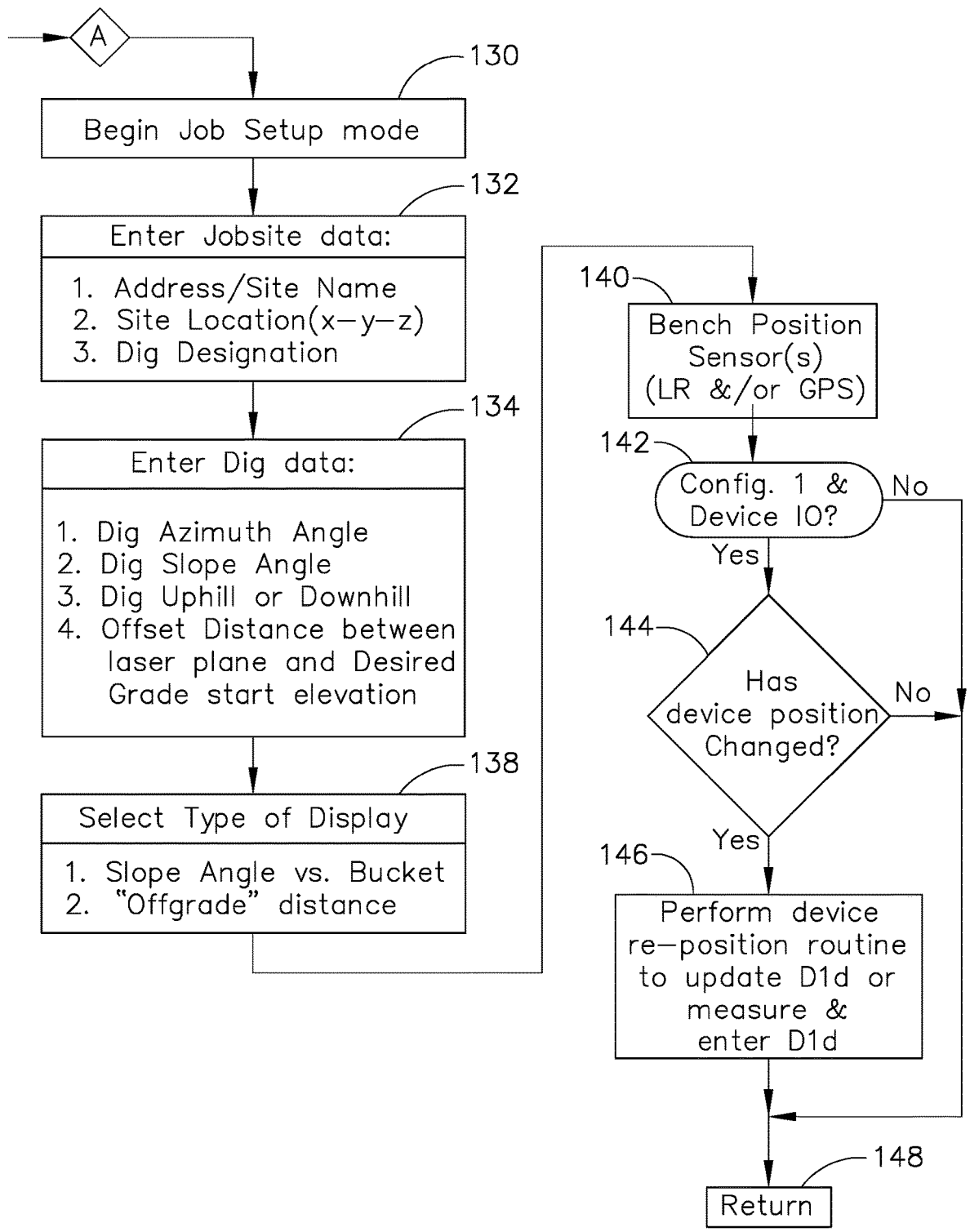
FIG. 12 is a flow chart of the steps performed by the integrated sensing device for a Job Setup mode before a dig.
Figure 13:
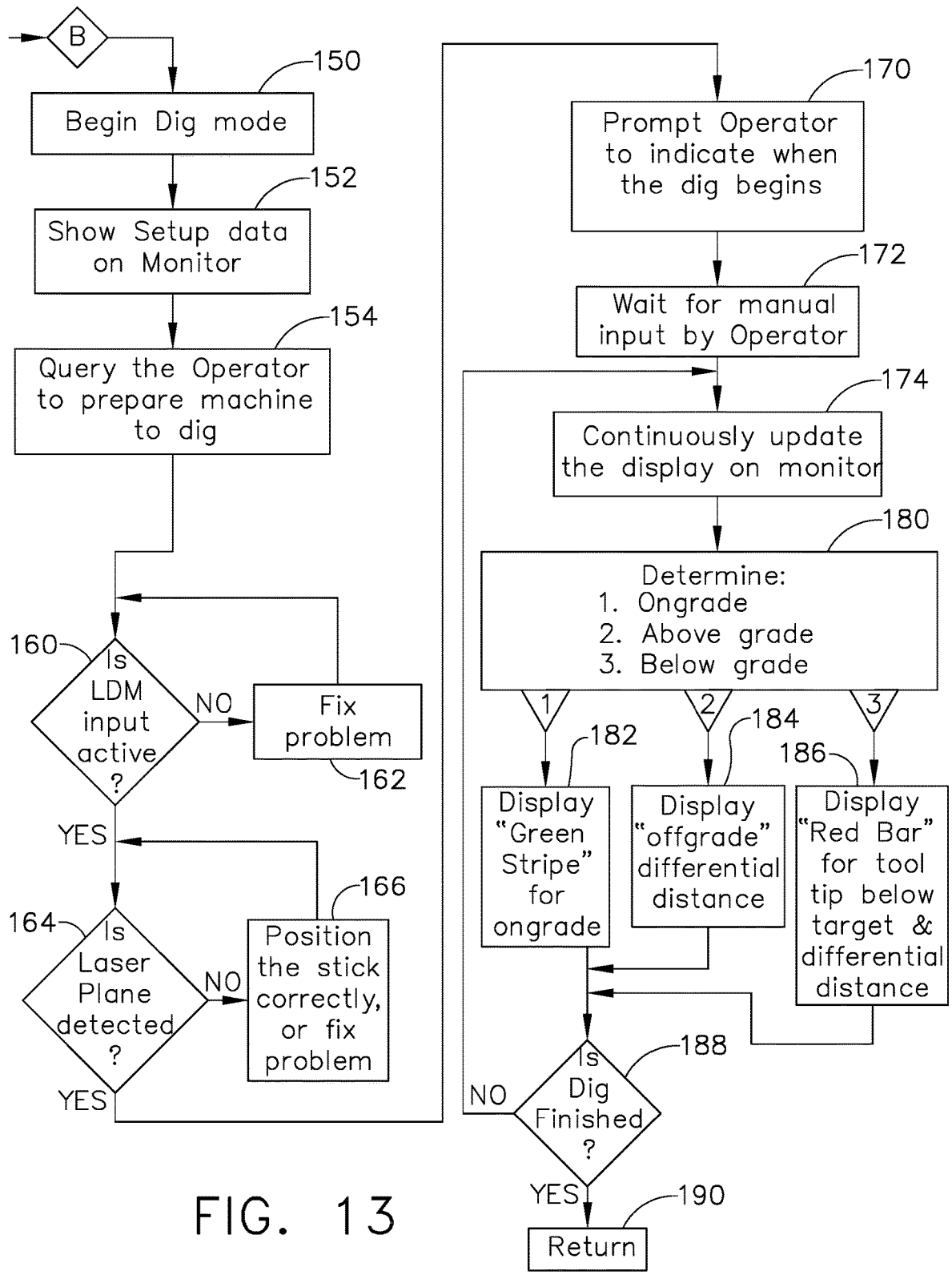
FIG. 13 is a flow chart of the steps performed by the integrated sensing device as combined with an excavator showing the steps performed during a Dig mode of operation.
Figure 18:
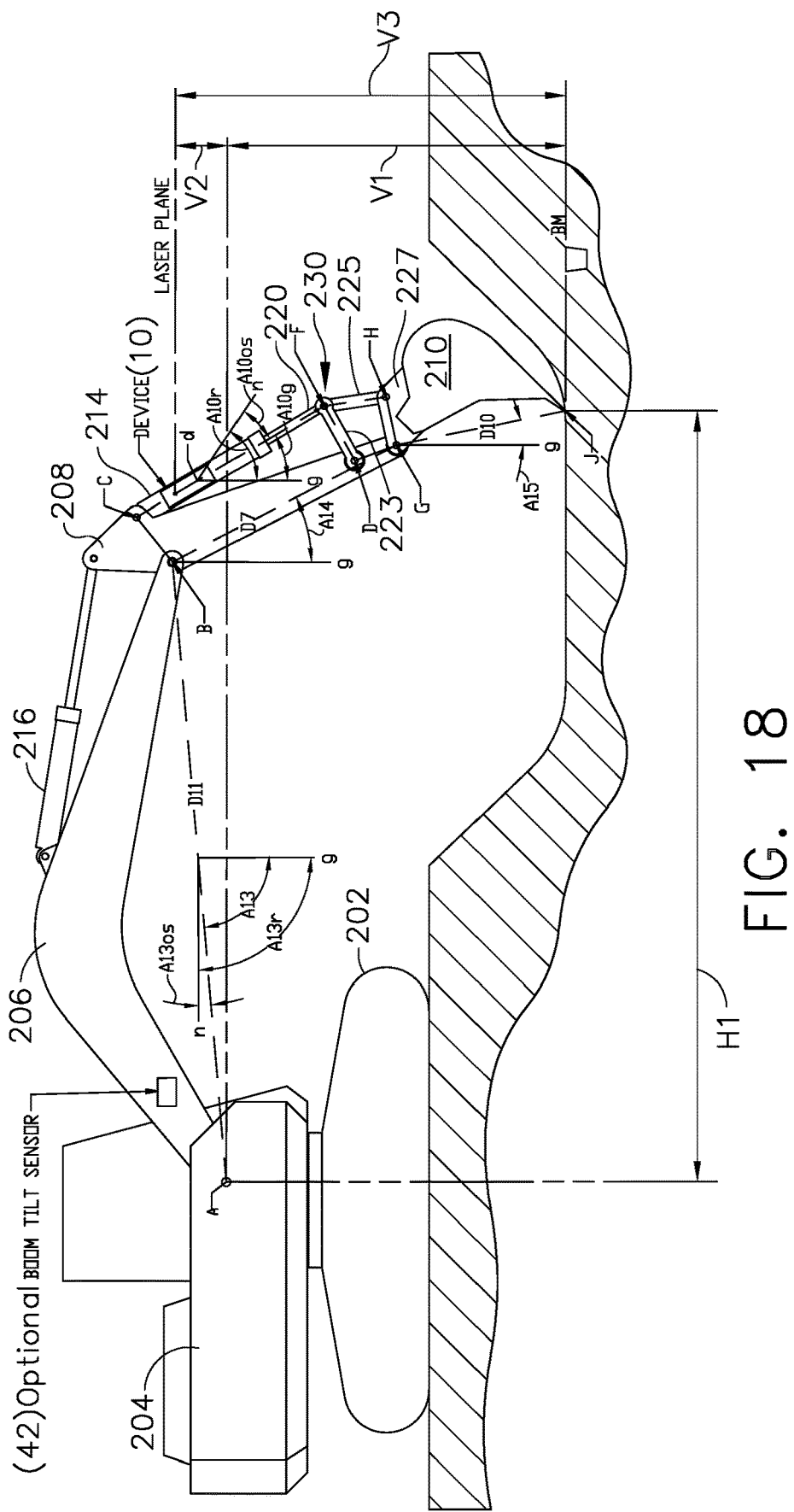
FIG. 18 is a diagrammatic view of an excavator having the integrated sensing device that is constructed according to the principles of the technology disclosed herein mounted to the bucket cylinder, showing some of the dimensions and angles that are discussed in connection with a calibration mode for installing the integrated sensing device onto the machine.
Figure 19:
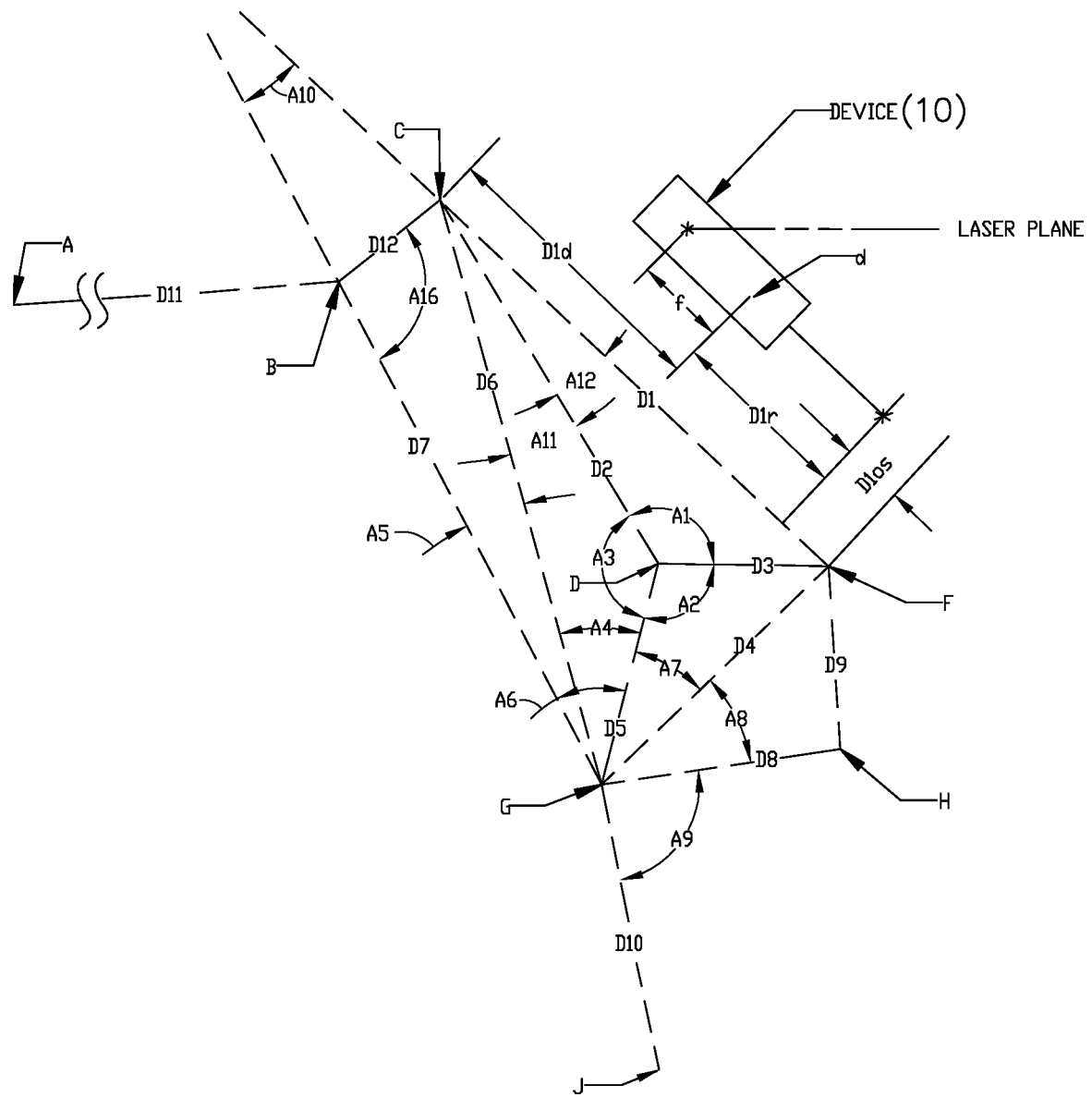
FIG. 19 is a diagrammatic view of the geometry involved with the calibration mode for the equipment depicted in FIG. 18.

Referring now to FIGS. 11-13, a flow chart is provided to show some of the major steps involved in operating the excavator machine along with the sensing device 10, 11. It will be understood that steps involved in the initial configuration and calibration (see FIG. 11) of the sensing device with a particular construction machine are steps that do not have to occur every time the machine is used, but instead typically occur when the equipment is first installed onto the machine. From that standpoint, FIGS. 12-13 represent flow charts of some of the important steps in operating the sensing device to work with an excavator machine, after its calibration has been performed. A more detailed calibration procedure is provided below, with reference to FIGS. 18 and 19.

An initialization step occurs at 100, and the operator of the excavator will be presented with a menu of appropriate modes which can be executed, at a decision step 102. The operator of the excavator machine will now select the type of remote monitor that will be used at a step 101. In general, there would be two main types of remote monitors, either a Smart Phone, or a machine monitor that is mounted in the excavator cab. This is definitely the user's choice, and if desired, both types of monitors could be used simultaneously, since the sensing device 10, 11 will be able to output information wirelessly to both types of monitors in a simultaneous fashion. (Note that the "local display" at 32 may not be needed at all, particularly since the sensing device 10 or 11 will likely be mounted to the excavator machine at a position that will not be easily viewable by the user. On the other hand, the local display 32 might be handy during set-up and/or calibration.) Later in this patent application document, certain types of displays for Smart Phones are provided to illustrate some exemplary displays that an excavator operator could use. Note that a hard-wired cable could alternatively be used to send signals to a remote monitor, if desired.

For a new system, only the "Configuration" mode will be displayed at this time. In the "Configuration" mode the operator is prompted to identify: the machine type 110 (at a step 110), which member the device 10, 11 is mounted to (at a step 112), which position sensor is being used (LR and/or GPS) (at a step 114), which member the target is mounted on (at a step 116), and whether the optional boom tilt sensor is present (at a step 118). From this configuration information, the system will determine: which geometric equations are to be used, which machine geometry dimensions are required, and which sensor calibrations are required (at a step 120). After the above configuration information is entered into the system, the system presents the user with the mode menu options (at decision step 102): "Revise or Check Configuration," and "Calibration."

If the user selects "Calibration" mode at step 102, the Calibration mode will prompt the user for machine geometry dimensions (at a step 122), which can be measured and entered individually or automatically by selecting a machine make and model (but only if they are unique to a machine make and model that is logged in the system database). Next, the Calibration mode will prompt to calibrate the device tilt and LDM sensors (at a step 124). This must be done while the stick and bucket are in known angular orientations with respect to gravity, for example when both the stick and the bucket are moved to a vertical position. An external vertical gravity reference such as a plumb bob or vertical laser beam can be used to align the stick and bucket. In any event, the "known orientation" position should be repeatable from one day to the next, if the operator is going to revise or check the calibrate function. Once the bucket and stick are in the known orientation, the laser distance meter reading and device tilt reading are sampled, and several bucket linkage dimensions are measured and stored in memory.

Next the Calibration mode will prompt for the device datum location calibration to the first member, at step 126. For both devices 10 and 11 this will be the distance(s) from a reference point on the first member to a datum point marked on the sensing device housing. The sensing device position sensor (LR and/or GPS) and the LDM measurements will reference this device datum point ("d"). Next the Calibration mode will prompt for the optional boom tilt sensor calibration, at a step 128. This calibration step is similar to the device tilt calibration step, in that the boom member must be placed in a known orientation with respect to gravity, and the sensor reading and boom member length are then stored in memory.

If only the laser receiver position sensor and no boom tilt sensor were selected in the previous Configuration mode, the user will be prompted to perform an optional bucket cylinder extents calibration, at a step 129. As noted above, this calibration would be used each time the device location on first member is re-positioned to best intercept the laser plane. Once performed, this calibration would save the operator effort by determining the device offset (D1*d*) by using a routine that fully retracts and/or extends the bucket cylinder instead of the operator manually measuring the device offset distance. The calibration procedure consists of fully extending and/or fully retracting the bucket cylinder while the device is in same position as above, for calibration steps 124 and 126. The LDM readings at each extent are stored in memory.

The parameters stored during above calibration will now be entered into the selected equations of step 120. It is also possible to use a look-up table instead of an equation, or perhaps a look-up table can be used along with a geometric equation, in which the look-up table only comes into play for certain portions of the cylinder rod extension, which would probably relate to any type of non-linearity in the physical makeup of the actual laser target when it is aiming at a particular member of the excavator.

A look-up table could be used in another alternate method of calibration that does not require measuring the bucket linkage geometry, but uses a tilt sensor temporarily attached to the bucket and a routine that starts with stick and bucket in known orientations, and exercises the bucket through its tilt range while recording the bucket tilt along with device LDM and tilt outputs. The I/O data from this routine would be stored in a look-up table and later used to calculate the bucket tilt angle while digging.

The system can have ultimate flexibility with regard to when to use a look-up table or to use a geometric equation. Generally speaking, using an equation would be better, because a look-up table will always have situations when some of the input values not included in the table will require the output value to be derived by interpolation.

Once the calibration is completed, the display will present the mode menu options (at decision step 102): "Revise or Check Configuration", "Revise or Check Calibration", and "Job Setup." If the Job Setup option is selected, then on the drawings, the logic flow travels from FIG. 11 to FIG. 12, through a letter "A". Arriving at FIG. 12 a step 130 begins the Job Setup mode. At step 132 the jobsite data is entered by the excavator machine operator, and includes certain information, such as the name of the jobsite or its address, the site's location in x-y-z coordinates (such as GPS coordinates), and also the dig designation that is about to be performed by the excavator machine. At a step 132, the operator now enters the dig data. This include the dig azimuth angle, the dig slope angle (which determines whether the dig is uphill or downhill), and the offset distance between a benchmark and the desired grade start elevation. Any other information that is desired by a particular contractor for the jobsite data or dig data can be added to the data listed on FIG. 12.

At a step 138, the operator now selects the type of display that will be depicted on the monitor. For example, one display would be a slope angle versus bucket position. Another type of display would be the "offgrade," which is a differential distance between the bucket working edge and the desired dig elevation. Example displays are provided for these two types of displays, at FIGS. 14-17. The user will be prompted to place the working tool edge at the desired digging elevation start point or at a benchmark (BM) at a step 140. A decision step 142 now determines if the configuration is a device 10 (of the first configuration) and no boom tilt sensor is installed, the user may want to re-position the device in order to best intercept the laser plane. The user is then prompted to press a key to indicate the tool is at its desired position and the system collects the sensor readings, stores the readings, and determines that position via the sensor readings. For configurations with laser receiver and no boom tilt sensor, laser strikes must be present during the bench step.

For systems with a laser receiver and boom tilt sensor, the benching could take two steps in which the working tool edge is placed at desired position in first step and the laser receiver intercepts the laser plane in a second step as long as the boom pin elevation does not change between steps these two steps. Next a prompt will ask if the device offset was changed at a decision step 144. If so, then the user may perform a device re-position routine at a step 146 (to fully extend and/or retract the bucket cylinder), or the user may manually measure the device offset and enter it into system memory to update the device offset. The routine is now finished and returns at a step 148.

The logic flow now directs the operator back to decision step 102 on FIG. 11, which asks which mode should now be executed by the control software. The operator is now ready to enter the "dig" mode, and the logic flow is directed to FIG. 13 through the letter "B". Arriving now at FIG. 13, a step 150 begins the Dig mode. The control software will now show the setup data on the monitor of choice, at a step 152. A step 154 now queries the operator to prepare the excavator machine to begin at the initial dig position for this particular operation. A decision step 160 now determines if the laser distance meter input is active. In other words, is the electronic distance measuring device successfully emitting a laser beam and receiving a reflected laser beam (or other type of beam if laser light is not being used). If the answer is no, then the operator should fix the problem at a step 162.

Once the LDM input is active, the control logic is directed to a decision step 164 which determines if the laser plane is being detected. If not, the operator will now position the stick correctly, or fix the problem if there is a hardware problem, at a step 166. (Note, this is only a requirement for a sensing device 10 (i.e., the first configuration) with no boom tilt sensor.) Once the laser plane has been detected, the logic flow is directed to a step 170 that prompts the operator to indicate when the dig begins. Again, the operator is asked to provide a manual input to the equipment at a step 172, or a benching function could be performed. Once that has occurred, a step 174 will now continuously update the display screen on the monitor so the operator can view the actual working tool edge elevation as compared to the desired elevation for this particular dig operation.

As part of the continuous update procedure, a step 180 determines whether or not the working edge of the bucket is either on-grade, above grade, or below grade. If on-grade, a step 182 will display a "green stripe" on the monitor. The numeric values will also be displayed as appropriate when the working tool is at the on-grade elevation.

At the beginning of a dig, the display will show an "offgrade" distance at a step 184. In general, this offgrade distance will be continuously displayed until the dig is near completion, at which time the on-grade indication will probably occur, according to step 182. On the other hand, if the excavator machine operator digs too deep, then a "red bar" showing the working tool edge below target will be displayed at a step 184. Not only will the red bar be displayed, but the offgrade distance will be indicated, so the excavator operator has an idea as to how much dirt needs to be filled back into place at that particular point in the dig to maintain the correct elevation for the dig.

A decision step 188 will now ask if a dig is finished. If the answer is no, then the logic flow is directed back to the continuously updating display step at 174. The control software will always display the dig elevations until the operator presses a "mode" key, for example. If the dig has been completed, then this routine returns at a step 190. The control logic will be directed back to mode option menu at step 102.

Figures 14, 15:
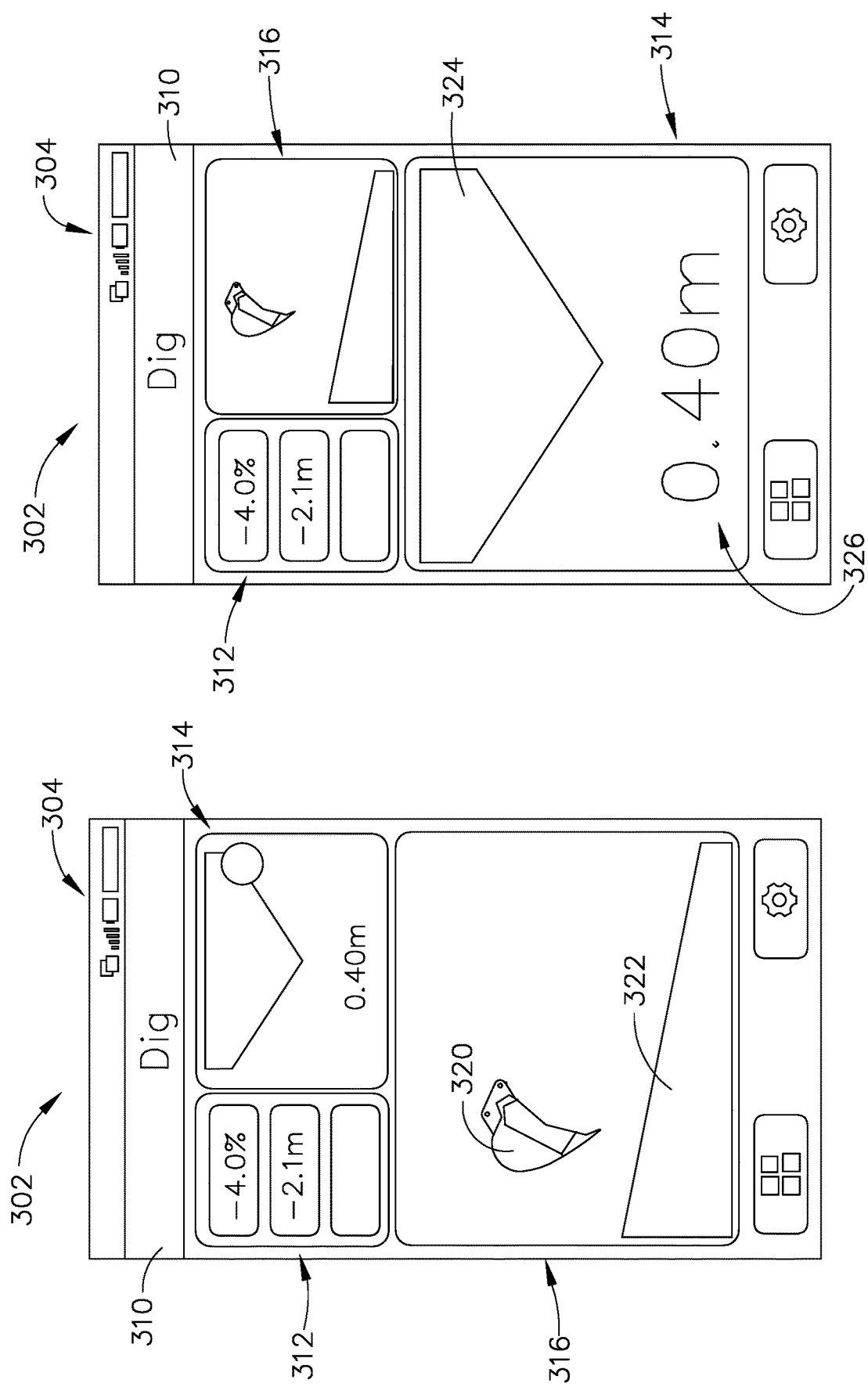
FIG. 14 is a diagrammatic view of an example display showing a Dig mode of operation when digging downhill.
FIG. 15 is diagrammatic view of an alternative display showing a downhill dig.

Referring now to FIG. 14, an example display that could be depicted on a Smart Phone is provided and is generally designated by the reference numeral 302. The right-upper field 304 shows the time and date stamp, and the large upper field at 310 shows the mode, which in this case is "dig." Some of the dig setup information is depicted at a field 312, including the percent grade of the dig (a negative number means the dig is downhill), and the offset distance between a benchmark and the elevation for the start portion of the dig.

The remaining two large fields 314 and 316 are near-instantaneous fields that will change simultaneously with the operation of the excavator, as provided through the sensing device inputs. The larger display portion 316 shows the slope angle versus the position of the bucket. The slope angle is at 322 and the bucket image or symbol is at 320. This is an informative display, as it shows the elevation of the bucket cutting edge with respect to the portion of the dig, at its present position along the digging of the trench, and takes the slope of that dig into account. This can be seen graphically in this field 316. The alternative type of display at 314 shows the offgrade distance, which, in this example is 0.40 meters.

Referring now to FIG. 15, the two large display fields 314 and 316 have been reversed so that the large offgrade distance field that was at 314 on FIG. 14 is now at reference numeral 326 on FIG. 15. The arrow symbol is at 324, and the numeric offgrade distance of 0.40 meters is depicted at 326. The other type of slope angle versus bucket symbol is displayed at 316 on FIG. 15. If desired, the operator can select one of these modes of display for one portion of the dig, and then switch to the other mode of display, and can reverse these display modes as desired.

Figure 16:
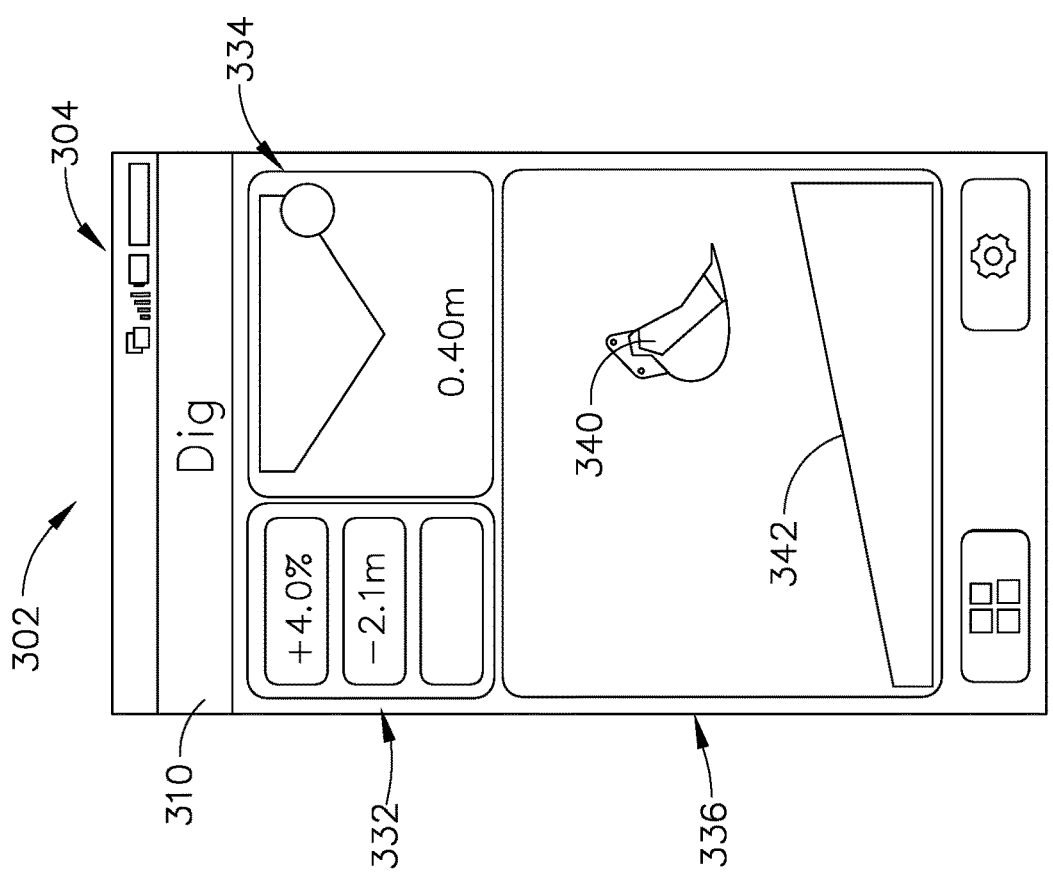
FIG. 16 is a diagrammatic view of an example display showing a Dig mode of operation when digging uphill.

Referring now to FIG. 16, the Smart Phone display 302 is once again depicted, except this time the example dig is uphill instead of downhill. A field 332 shows that the percentage grade of the slope is +4.0% (digging uphill), whereas on FIG. 14 the example grade was −4.0%. Consequently the larger field at 336 on FIG. 16 shows the dig elevation in the opposite direction at 342 as compared to the symbol 322 on FIG. 14. The bucket symbol 340 is also reversed in orientation as compared to the bucket symbol 320 on FIG. 14.

Figure 17:
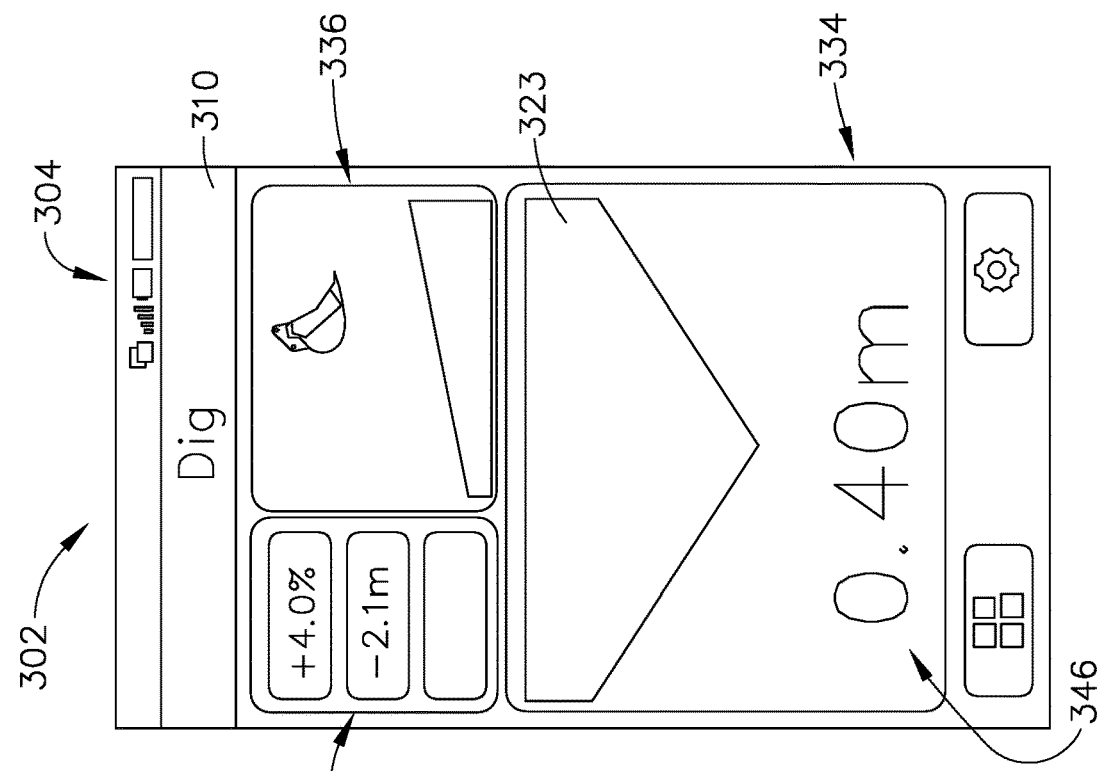
FIG. 17 is a diagrammatic view of an alternate display showing an uphill dig.

In a similar fashion, a display at FIG. 17 shows the alternative mode of displaying this information. The slope angle versus bucket symbol is at a field 336 on FIG. 17, and again the slope is in the opposite direction as compared to that depicted in FIG. 15. The larger field 346 on FIG. 17 looks the same as that on the FIG. 15, and this is showing the current offgrade distance of 0.40 meters in the field at 346. The arrow symbol is at 323, and the numeric offgrade distance of 0.40 meters is depicted at 346. In essence, the fields 334, 336, on both FIGS. 16 and 17 all show the same information; they just show it in a different format and using different symbols. The same can be said for the fields 314 and 316 on FIGS. 14 and 15.

It will be understood that other types of displays can be used showing either the same information or somewhat different information, but all falling within the principles of the technology disclosed herein. Typically the most important information is the position of the working tool of the bucket with respect to the desired final dig elevation, at a certain position along a trench or ditch being dug, particularly if that digging is to be sloped instead of merely horizontal.

One of the main advantages of the sensing device disclosed herein is the fact that it contains all of the sensors in a single factory-calibrated unit, and is mounted at one place on the excavator machine. Once it has been mounted and "aimed" at the correct target location, the setup operator can do the final calibration for mating the sensing device to the excavator machine, and it should be then quite repeatable and accurate. The types of sensors involved are all rugged, reliable, and commonly used devices in the construction industry, so the equipment operators will be quite comfortable with using this type of sensing device. In addition, mainly depending upon the actual geometry of a specific model and make of excavator, the laser distance meter portion of the sensing device 10, 11 can be aimed at any specific machine member that is desired, and the good system repeatability will work well using the correct geometric equations. There is great flexibility here, because different excavator machines will have different linkages, yet there will be some place on every type of construction machine that will accommodate this type of system. An example of such geometric equations is provided below.

Calibration Set-Up for First Configuration

A more detailed description of an example of steps for calibrating the sensing device to a machine is now provided, including a derivation of equations of motion for one of the possible configurations of the technology disclosed herein. This calibration example is directed toward the configurations are that illustrated in FIGS. 5-8, in which there is no boom tilt sensor, and the sensing device is mounted to the bucket cylinder. In addition to that embodiment, there is a provision for re-positioning the sensing device 10 parallel to the bucket cylinder extension axis that is referred to as "D1" in this description. See FIGS. 18 and 19 for the exact pivot and dimension definitions used herein. Note that "BM" refers to a "benchmark" that, for these examples is the elevation reference of the jobsite and the desired digging elevation (offset distance=0).

The sensing device's LDM (laser distance meter) beam 12 is parallel to the axis D1 and targets a point on the bucket linkage that moves with pin F (at the pivot point 230). In this example configuration analysis, only tilt in the plane of these views (i.e., FIGS. 18 and 19) is considered; cross axis tilt terms could be added, as a further option. In this example, it is assumed that the laser receiver position sensor will be used; therefore, the sensing device will be referred to by the reference numeral 10, not 11. It is assumed that the device configuration (or set-up) has been completed.

The following is an outline of the calibration steps for this example:

(1) Enter machine geometry (step 122 on FIG. 11):
  (a) Mount the sensing device 10 to the bucket cylinder 214.
  (b) With machine members in any orientation, measure D2, D3, D5, D7, D8, D9, and D10. Enter and store these dimensions in system memory.

(2) Calibrate sensing device tilt and LDM sensors (step 124 on FIG. 11):
  (a) Orient machine members such that D7 and D10 are both vertical with respect to gravity.
  (b) Use an external reference such as plumb bob or vertical laser plane for this.
  (c) Measure D1 and D4. Enter and store these dimensions in system memory.
  (d) Press key that initiates collection of sensing device tilt sensor reading ($A10r$), sensing device LDM reading ($D1r$), and system calculation of, using the following equations:

$$A1 = \arccos((D2^2 + D3^2 - D1^2)/2 * D2 * D3) \quad \text{EQUATION 1:}$$

$$A2 = \arccos((D3^2 + D5^2 - D4^2)/2 * D3 * D5) \quad \text{EQUATION 2:}$$

$$A3 = 360 - A1 - A2 \quad \text{EQUATION 3:}$$

$$D6 = (D2^2 + D5^2 - 2 * D2 * D5 * \cos A3)^{0.5} \quad \text{EQUATION 4:}$$

$$A4 = \arccos((D5^2 + D6^2 - D2^2)/2 * D5 * D6) \quad \text{EQUATION 5:}$$

$$A5 = \arccos((D6^2 + D7^2 - D12^2)/2 * D6 * D7) \quad \text{EQUATION 6:}$$

$$A6 = A4 + A5 \quad \text{EQUATION 7:}$$

$$A7 = \arccos((D4^2 + D5^2 - D3^2)/2 * D4 * D5) \quad \text{EQUATION 8:}$$

$$A8 = \arccos((D4^2 + D8^2 - D9^2)/2 * D4 * D8) \quad \text{EQUATION 9:}$$

$$A9 = 180 - A6 - A7 - A8 \quad \text{EQUATION 10:}$$

$$A11 = \arccos((D2^2 + D6^2 - D5^2)/2 * D2 * D6) \quad \text{EQUATION 11:}$$

$$A12 = \arccos((D1^2 + D2^2 - D3^2)/2 * D1 * D2) \quad \text{EQUATION 12:}$$

$$A10 = A11 + A12 - A5 \quad \text{EQUATION 13:}$$

$A10os$=Sensing device tilt sensor reading offset from angle $A10$ $$A10os = A10r - A10 \quad \text{EQUATION 14}$$

(3) Calibrate sensing device datum location to first member (step 126 on FIG. 11):
  Without moving $D1d$ from step (2)
  Measure and ender $D1d$ into system memory.
  $D10s$=distance from target reflection to pivot F.
  $D1d$=distance from bucket cylinder pin C to sensing device datum d.

$$D10s = D1 - D1d - D1r \quad \text{EQUATION 15:}$$

$$A16 = \arccos((D7^2 + D12^2 - D6^2)/2 * D7 * D12) \quad \text{EQUATION 16}$$

(4) Optional Calibrate bucket cylinder extents with LDM (step 129 on FIG. 11):
  (a) With machine members in any orientation, but without changing $D1d$ from Step (2).
  (b) Fully retract the bucket cylinder and press a key to initiate calculation of Minimum bucket cylinder length from pivot C to F (D1min).

$$D1\min = D1os + D1d + D1r \quad \text{EQUATION 17}$$

D1min is automatically stored in system memory.
  (c) Alternately, or additionally, the bucket cylinder could be fully extended and D1max could similarly be calculated and stored in memory.

(5) Job Setup, Step 1 (step 144 on FIG. 12):
  (a) Move machine to work site and place bucket tooth J at (BM).
  (b) Set up laser plane transmitter.
  (c) If needed adjust position of sensing device along bucket cylinder axis (which changes $D1d$) to intercept laser plane.
  (d) If $D1d$ has not changed, use its previous value.
  (e) Or, if $D1d$ has changed, perform device re-position routine (step 146 on FIG. 12):
    (i) The control system prompts user to fully retract bucket cylinder and press key to initiate calculation of the distance from bucket cylinder pin C to sensing device (D1$d$min).

$$D1d\min = D1\min - D1os - D1r \quad \text{EQUATION 18}$$

Automatically store D1$d$min in memory.
    (ii) Alternately or additionally if D1max was collected in step 3, by similar method calculate D1$d$max and store in memory.
    (iii) The control system automatically updates $D1d$.

$$D1d = D1d\min \quad \text{EQUATION 19}$$

(iv) Alternately if D1dmax was collected use it in (E19) or additionally if both D1min and D1dmax are collected, average them to get D1d in (E19).
(v) Store updated D1d in memory.
(6) Set up bench position sensor (step 140 on FIG. 12):
(a) The control system prompts user to "Bench" the system by ensuring bucket tooth J is at desired digging depth (at the BM) while sensing device is receiving laser strikes, and then pressing a key to initiate calculation of:
(b) Equations E1, E8, E9, E12, E13 updated with sensing device output (D1r and A10r).

$$D1 = D1d + D1r + D1os \quad \text{EQUATION 20:}$$

$$A10g = A10r - A10os \quad \text{EQUATION 21:}$$

$$A14 = A10g - A10 \quad \text{EQUATION 22:}$$

$$A2 = 360 - A1 - A3 \quad \text{EQUATION 23:}$$

$$D4 = (D5^2 + D3^2 - 2 \cdot D5 \cdot D3 \cdot \cos A2)^{0.5} \quad \text{EQUATION 24:}$$

$$A15 = A14 + 180 - A6 - A7 - A8 - A9 \quad \text{EQUATION 25:}$$

(c) The vertical distance from laser plane to bucket tooth J while J at desired depth BM (V3). This equation is also used for GPS antenna with centroid at d (f=0).

$$V3 = (D1d - f) \cdot \cos(A10g) - D8 \cdot \cos(A14 + A16) - D7 \cdot \cos(A14) - D10 \cdot \cos(A15) \quad \text{EQUATION 26:}$$

wherein: f=Distance from laser strike to sensing device datum.
(7) Dig:
(a) When the sensing device intercepts and receives laser strikes from the laser plane, the system continually calculates:
  (i) The current vertical distance from laser plane to bucket tooth while bucket tooth is at any position (V3'), using equation E26. (This mode uses the same equations as Setup bench position sensor.)
  (ii) The difference between the current depth V3' and the desired depth V3 ($\Delta$V3).

$$\Delta V3 = V3' - V3 \quad \text{EQUATION 27:}$$

(b) $\Delta$V3 is continually updated and displayed to the user. An elevation offset term could be added to equation 27 for situations when the desired elevation does not equal the benchmark elevation.

Calibration Set-Up for Second Configuration

Another more detailed description of an example of steps for calibrating the sensing device to a machine is now provided for a second configuration, similar to that described above for a first configuration. This second example again includes a derivation of (new) equations of motion needed for this second configuration. This second calibration example is directed toward the configurations that are illustrated in FIGS. 5-8, in which there is a boom tilt sensor (at 42), and there is a reference pin at A (i.e., at the boom pivot point). Again, the sensing device 10 is mounted to the bucket cylinder.

There could be a provision for moving sensing device 10 parallel to the bucket cylinder extension axis, referred to as "D1" in this description, however, it will be assumed that there will be no need for moving the sensing device because of the added boom tilt sensor 42. Instead, the dimension D1 will therefore be a fixed distance in this second configuration example. See FIGS. 18 and 19 for the exact pivot and dimension definitions used herein.

The sensing device's LDM (laser distance meter) beam 12 is parallel to the axis D1 and targets a point on the bucket linkage that moves with pin F (at the pivot point 230). In this example configuration analysis, only tilt in the plane of these views (i.e., for FIGS. 18 and 19) is considered; cross axis tilt terms could be added, as a further option. In this example, it is assumed that the laser receiver function will be used while performing these calibration steps; therefore, the sensing device will again be referred to by the reference numeral 10, not 11.

The following is an outline of the calibration steps for this second example:
(1) Enter machine geometry (step 122 on FIG. 11):
This is the same as for the first configuration example (above), Step 1 except for adding a new measurement at D11.
(2) Calibrate sensing device tilt and LDM (step 124 on FIG. 11):
This is the same as for the first configuration example (above), Step 2.
(3) Optional Calibrate boom tilt sensor (step 128 on FIG. 11):
(a) Orient machine boom member such that D11 is horizontal with respect to gravity.
(b) Use an external reference such as level or horizontal laser plane.
(c) D7 and D11 can move from vertical.
(d) Press key that initiates collection of Boom Tilt sensor A13r and system calculates;

$$A13os = A13r \text{ (while } D11 \text{ held horizontal).} \quad \text{EQUATION 28:}$$

A13r=Boom tilt Sensor reading
A13os=Boom tilt sensor offset from D11.

$$A13 = A13r - A13os \quad \text{EQUATION 29:}$$

A13=D11 angle with respect to gravity.
(4) Set Up bench position sensor (step 140 on FIG. 12):
(a) Place bucket tooth J at the benchmark (BM).
  (i) Press key to initiate calculations.
  (ii) Update equations E1, E8, E9, E12, E13 and E20-E25.

$$V1 = D11 \cdot \cos(A13) - D7 \cdot \cos(A14) - D10 \cdot \cos(A15) \quad \text{EQUATION 30:}$$

V1=Vertical distance from boom pin A to bucket tooth J while at BM.

$$H1 = D11 \cdot \sin(A13) + D7 \cdot \sin(A14) + D10 \cdot \sin(A15) \quad \text{EQUATION 31:}$$

H1=Horizontal distance from boom pin A to bucket tooth J while at BM.
Used for slope and horizontal display with respect to pin A.
(b) Without vertically moving boom pin A, orient members to place laser receiver in laser plane.
  (i) Press key to initiate calculations.
  (ii) Update equations E12, E13 and E20-E22.

$$V2 = D11 \cdot \cos(A13) - D12 \cdot \cos(A14 + A16) + (D1d - f) \cdot \cos(A10g) \quad \text{EQUATION 32:}$$

V2=Vertical distance boom pin A to laser plane. This equation is also used for GPS antenna with centroid at d (f=0).

$$V3'' = V1 + V2 \quad \text{EQUATION 33:}$$

V3''=Vertical distance from laser plane to bucket tooth J while at BM.
(c) If requirements met, steps 4a and 4b may be performed simultaneously.

(5) Dig:
(a) The current vertical distance from boom pin A to bucket tooth J (V1') is continually updated using E30.
(b) The current vertical distance from laser plane to boom pin A (V2') is updated when the laser receiver intercepts the laser plane using E32.
(c) The current vertical distance from laser plane to bucket tooth is determined by:

$$V3'''=V1'+V2' \qquad \text{EQUATION 34:}$$

(d) The difference in current to benched V3 is given by:

$$\Delta 3'=V3''-V3'' \qquad \text{EQUATION 35:}$$

(e) ΔV3' is continually compared to the desired dig elevation and displayed to the user. An elevation offset term could be added to equation 35 for situations when the desired elevation does not equal the benchmark elevation.

It will be understood that the principles of the technology disclosed herein can be applied to other types of construction equipment besides excavators. For example, these equations and the equipment of the sensing device to be used on a front-end loader. In this situation, the loader has an articulated bucket that is mounted to a pair of arms (sometimes called "booms"), and the articulated bucket has a working tool edge that does the earthmoving (or "digging") to a particular elevation. Other construction machines can use this technology, such as certain models of Bobcats, for example.

As noted above, the mounting position of the sensing device 10 can be made so it can be adjusted up or down along the length of the bucket cylinder housing, which allows the laser receiver photosensors to be positioned along a greater distance, to accommodate situations where the excavator has to make deeper or shallower digs with respect to the position of the rotating laser plane 90. Of course, if the sensing device 10 is moved up or down along some type of mounting bracket, thereby changing its position on the bucket cylinder, then the device offset distance (D1*d*) between the LDM output datum "d" and a reference point on the first member (pin C) must be entered into the system, to maintain the accuracy of the geometric equations.

It will further be understood that the sensing device 10, 11 potentially can be mounted on other members of an excavator; for example, it could be mounted on the stick, rather than on the bucket cylinder. Its laser distance meter would still be generally aimed toward the bucket, perhaps at the dogbone link or the down link, or perhaps at a portion of the bucket itself, or at a reflective target that is mounted on one of those machine members. Different geometric equations might be needed, depending on which member is selected as the target for the laser beam of the LDM.

It will yet further be understood that the optional GPS receiver and the optional boom angle sensor can assist the operator of the excavator for portions of the dig when the laser receiver photosensors are not positioned within the laser plane 90. There are limitations to the accuracy for the vertical height when using the GPS receiver, and also GPS satellite constellation "aiming" problems due to signals being blocked by intervening objects. Finally, there are operational constraints on using the boom pivot for an elevation reference when the position sensor is temporarily not functioning, such as not being allowed to move the boom pivot elevation during such a procedure.

It will be understood that the logical operations described in relation to the flow charts of FIGS. 11-13 can be implemented using sequential logic (such as by using microprocessor technology), or using a logic state machine, or perhaps by discrete logic; it even could be implemented using parallel processors. One preferred embodiment may use a microprocessor or microcontroller to execute software instructions that are stored in memory cells within an ASIC. In fact, the entire microprocessor 26), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the dig activity data stored, for example, in memory circuit 28), or perhaps by a type of memory device not yet invented.

It will also be understood that the precise logical operations depicted in the flow charts of FIGS. 11-13, and discussed above, could be somewhat modified to perform similar, although not exact, functions without departing from the principles of the technology disclosed herein. The exact nature of some of the decision steps and other commands in these flow charts are directed toward specific future models of integrated laser receiver systems, or integrated construction equipment sensing devices (those involving laser receivers sold by Trimble Navigation Limited, for example) and certainly similar, but somewhat different, steps would be taken for use with other models or brands of sensing systems in many instances, with the overall inventive results being the same.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An apparatus, comprising:
   (a) an integrated plurality of sensors that is mounted to a construction machine which has a first movable mechanical member that exhibits movement through a pathway that is variable with respect to gravity, and has a second movable mechanical member that includes a working tool edge, wherein said second movable mechanical member has a known physical moving relationship to said first movable mechanical member through a predetermined range of motions, said integrated plurality of sensors comprising:
      (i) a Global Positioning System (GPS) receiver;
      (ii) an electronic angle sensor;
      (iii) an electronic distance sensor, having an output port that is directed at a predetermined target, and which determines a distance to said target without making physical contact with said target;
      (iv) a processing circuit and a memory circuit including instructions executable by said processing circuit; and
      (v) a housing, in which said GPS receiver, said electronic angle sensor, said electronic distance sensor, said processing circuit, and said memory circuit are all mounted with said housing;
   (b) wherein:
      (i) said integrated plurality of sensors is mounted to said first movable mechanical member of the construction machine at a single position on the construction machine, but not at a pivot point of said second movable mechanical member;
      (ii) said electronic distance sensor determines said distance between said output port and said predetermined target;
      (iii) said predetermined target comprises a surface portion of said construction machine that moves at the same time as said second movable mechanical member moves with respect to said first movable mechanical member;
      (iv) said surface portion comprises one of:
         (A) a surface area of a movable mechanical target member;
         (B) a reflector placed on said movable mechanical target member;
         (C) a surface area of a first movable mechanical linkage member that is mechanically connected to at least one of said first movable mechanical member and said second movable mechanical member; and
         (D) a reflector placed on a second movable mechanical linkage member that is mechanically connected to at least one of said first movable mechanical member and said second movable mechanical member; and
      (v) said first movable mechanical member exhibits a first shape having a known first geometry, said second movable mechanical member exhibits a second shape having a known second geometry; said first and second known geometries having a known relationship with one another while said first and second movable mechanical members are pivoted during operation, in which said distance involves a rotation of said second movable mechanical member about said first movable mechanical member; and
   (c) wherein: said processing circuit is configured to calculate a vertical distance between a GPS antenna centroid and said working tool edge, based upon a state of sensor outputs of said GPS receiver, said electronic angle sensor, and said electronic distance sensor.

2. The apparatus of claim 1, wherein said electronic angle sensor comprises a gravity sensor.

3. The apparatus of claim 1, wherein said electronic distance sensor comprises a laser distance meter.

4. The apparatus of claim 1, wherein said first movable mechanical member comprises one of: a dipper stick of an excavator; a bucket cylinder of an excavator; an arm of a front-end loader; and a bucket cylinder of a front-end loader.

5. The apparatus of claim 1, wherein said second movable mechanical member comprises one of: a bucket of an excavator; and a bucket of a front-end loader.

6. The apparatus of claim 1, further comprising:
   (d) a first communications circuit at said integrated plurality of sensors, under control of said processing circuit; and
   (e) a remote visible monitor screen having a second processing circuit, a second memory circuit including instructions executable by said second processing circuit, and a second communications circuit, under control of said second processing circuit;

wherein said visible monitor screen is configured to graphically display a physical relationship between said working tool edge and a desired dig position, in real time.

7. A method for digging on a construction jobsite, said method comprising:
(a) providing an integrated plurality of sensors, comprising:
  (i) a Global Positioning System (GPS) receiver;
  (ii) an electronic angle sensor;
  (iii) an electronic distance sensor, having an output port that is directed at a predetermined target, thereby determining a distance to said target without making physical contact with said target;
  (iv) a processing circuit and a memory circuit including instructions executable by said processing circuit; and
  (v) a housing, in which said GPS receiver said electronic angle sensor, said electronic distance sensor, said processing circuit, and said memory circuit are all mounted with said housing;
(b) mounting said integrated plurality of sensors to a first movable mechanical member of a construction machine at a single position on the construction machine, but not at a pivot point of a second movable mechanical member, wherein:
  (i) said first movable mechanical member exhibits movement through a pathway that is variable with respect to gravity; and
  (ii) said second movable mechanical member of the construction machine includes a working tool edge used in digging solid material, said second movable mechanical member having a known physical moving relationship to said first movable mechanical member through a predetermined range of motions;
(c) using said electronic distance sensor, determining said distance between said output port and said predetermined target, wherein:
  (i) said predetermined target comprises a surface portion of the construction machine that moves at the same time as said second movable mechanical member moves with respect to said first movable mechanical member;
  (ii) said surface portion comprises one of:
    (A) a surface area of a movable mechanical target member;
    (B) a reflector placed on said movable mechanical target member;
    (C) a surface area of a first movable mechanical linkage member that is mechanically connected to at least one of said first movable mechanical member and said second movable mechanical member; and
    (D) a reflector placed on a second movable mechanical linkage member that is mechanically connected to at least one of said first movable mechanical member and said second movable mechanical member; and
  (iii) said first movable mechanical member exhibits a first shape having a known first geometry, said second movable mechanical member exhibits a second shape having a known second geometry; said first and second known geometries having a known relationship with one another while said first and second movable mechanical members are pivoted during operation, in which said distance involves a rotation of said second movable mechanical member about said first movable mechanical member; and
(d) calculating a vertical distance between a GPS antenna centroid and said working tool edge, based upon a state of sensor outputs of said GPS receiver, said electronic angle sensor, and said electronic distance sensor.

8. The method of claim 7, wherein said electronic angle sensor comprises a gravity sensor.

9. The method of claim 7, wherein said electronic distance sensor comprises a laser distance meter.

10. A method for digging on a construction jobsite, said method comprising:
(a) providing an integrated plurality of sensors, comprising:
  (i) a Global Positioning System (GPS) receiver;
  (ii) an electronic angle sensor;
  (iii) an electronic distance sensor, having an output port that is directed at a predetermined target, thereby determining a distance to said target without making physical contact with said target;
  (iv) a processing circuit and a memory circuit including instructions executable by said processing circuit; and
  (v) a housing;
(b) assembling said sensors with said housing to create a unitary package, including each of said GPS receiver, said electronic angle sensor, and said electronic distance sensor;
(c) before any field installation, calibrating said sensors, including calibrating each of said GPS receiver, said electronic angle sensor, and said electronic distance sensor;
(d) then mounting said integrated plurality of sensors to a first movable mechanical member of a construction machine wherein:
  (i) said first movable mechanical member exhibits movement through a pathway that is variable with respect to gravity; and
  (ii) said second movable mechanical member of the construction machine includes a working tool edge used in digging solid material, said second movable mechanical member having a known physical moving relationship to said first movable mechanical member through a predetermined range of motions;
(e) using said electronic distance sensor, determining said distance between said output port and said predetermined target, wherein:
  (i) said predetermined target comprises a surface portion of the construction machine that moves at the same time as said second movable mechanical member moves with respect to said first movable mechanical member;
  (ii) said surface portion comprises one of:
    (A) a surface area of a movable mechanical target member;
    (B) a reflector placed on said movable mechanical target member;
    (C) a surface area of a first movable mechanical linkage member that is mechanically connected to at least one of said first movable mechanical member and said second movable mechanical member; and
    (D) a reflector placed on a second movable mechanical linkage member that is mechanically connected to at least one of said first movable mechanical member and said second movable mechanical member; and (iii) said first movable mechanical member exhibits a first shape having a known first geometry, said second movable mechanical member exhibits a second shape having a known second geometry; said first and second known geometries having a known relationship with one another while said first and second movable mechanical members are pivoted during operation, in which said distance involves a rotation of said second movable mechanical member about said first movable mechanical member; and (f) calculating a vertical distance between a GPS antenna centroid and said working tool edge, based upon a state of sensor outputs of said GPS receiver, said electronic angle sensor, and said electronic distance sensor.

11. The method of claim 10, further comprising the steps of:

(g) after mounting said integrated plurality of sensors to said first movable mechanical member of the construction machine, performing a configuration procedure to set-up the integrated plurality of sensors with the construction machine, during which a user is prompted for information about the specific construction machine; and then (h) performing a machine calibration mode to measure predetermined machine geometry dimensions using said integrated plurality of sensors, all without the need to recalibrate any of the individual sensors of the integrated plurality of sensors.

12. The method of claim 10, further comprising the steps of:

(g) providing a first communications circuit at said integrated plurality of sensors, under control of said processing circuit;

(h) providing a remote visible monitor screen having a second processing circuit, a second memory circuit including instructions executable by said second processing circuit, and a second communications circuit, under control of said second processing circuit; and (i) graphically displaying, on said visible monitor screen, a physical relationship between said working tool edge and a desired dig elevation, in real time.

* * * * *